(12) United States Patent
Clark

(10) Patent No.: US 12,539,528 B2
(45) Date of Patent: Feb. 3, 2026

(54) SLACK SEPARATION APPARATUS AND METHOD

(71) Applicant: ISHIDA EUROPE LIMITED, Birmingham (GB)

(72) Inventor: Nickolas Martin Clark, Sedgley (GB)

(73) Assignee: ISHIDA EUROPE LIMITED, Birmingham (GB)

( * ) Notice: Subject to any disclaimer, the term of this patent is extended or adjusted under 35 U.S.C. 154(b) by 0 days.

(21) Appl. No.: 18/847,993

(22) PCT Filed: Mar. 17, 2023

(86) PCT No.: PCT/GB2023/050647
§ 371 (c)(1),
(2) Date: Sep. 17, 2024

(87) PCT Pub. No.: WO2023/175350
PCT Pub. Date: Sep. 21, 2023

(65) Prior Publication Data
US 2025/0196190 A1     Jun. 19, 2025

(30) Foreign Application Priority Data
Mar. 18, 2022   (GB) .................................... 2203805

(51) Int. Cl.
*B07B 13/16* (2006.01)
*B07B 13/04* (2006.01)
(Continued)

(52) U.S. Cl.
CPC .............. *B07B 13/16* (2013.01); *B07B 13/04* (2013.01); *B65B 1/06* (2013.01); *B65B 1/32* (2013.01);
(Continued)

(58) Field of Classification Search
CPC .. B07B 1/04; B07B 1/28; B07B 13/16; B65B 1/06
See application file for complete search history.

(56) References Cited

U.S. PATENT DOCUMENTS 299,903 A * 6/1884 Berry ....................... B01J 8/002
                                                          209/403
699,134 A * 5/1902 Austin .................. F24B 15/007
                                                          209/246

(Continued)

FOREIGN PATENT DOCUMENTS

| CN | 110394306 A | 11/2019 |
| EP | 3 873 681 A1 | 9/2021 |

(Continued)

OTHER PUBLICATIONS

International Search Report and Written Opinion of the International Searching Authority mailed Jun. 23, 2023 issued in PCT International Application No. PCT/GB2023/050647.

*Primary Examiner* — Joseph C Rodriguez
(74) *Attorney, Agent, or Firm* — SQUIRE PATTON BOGGS (US) LLP

(57) ABSTRACT

Disclosed are a hopper, method and system comprising the hopper for separating slack from a mixture of product and slack, the hopper comprising a first gate that is moveable between respective open and closed positions; and a slack removal body the first gate and the slack removal body being arranged such that, when the first gate is in its closed position, they define a first product receiving volume therebetween wherein the slack removal body comprises a first internal chamber for receiving slack and a first filter wall that separates the first internal chamber from the first product receiving volume, the first filter wall being configured to prevent the passage of product therethrough, but to allow the passage of slack therethrough wherein the first gate is (Continued)

configured such that: when the first gate is in its open position a first path is provided for product to exit the first product receiving volume and when the first gate is in its closed position the first path is closed and product may be retained in the first product receiving volume and wherein the slack removal body is configured to remain substantially stationary as the first gate is moved between its respective open and closed positions.

20 Claims, 10 Drawing Sheets

(51) Int. Cl.
*B65B 1/06* (2006.01)
*B65B 1/32* (2006.01)
*B65B 39/00* (2006.01)

(52) U.S. Cl.
CPC ...... *B65B 39/002* (2013.01); *B65B 2039/008* (2013.01)

(56) References Cited

U.S. PATENT DOCUMENTS

| | | | | |
|---|---|---|---|---|
| 1,391,073 | A * | 9/1921 | Peters | F24B 15/007 |
| | | | | 209/373 |
| 1,945,242 | A * | 1/1934 | Walker | B02B 1/08 |
| | | | | 209/378 |
| 3,722,464 | A * | 3/1973 | Evans | B07B 13/003 |
| | | | | 422/216 |
| 4,411,778 | A * | 10/1983 | Venable | B07B 1/46 |
| | | | | 209/314 |
| 9,233,397 | B1 | 1/2016 | Johnson | |
| 10,471,399 | B1 * | 11/2019 | Hellbusch | B01F 35/71731 |
| 12,246,353 | B2 * | 3/2025 | Vine | B65B 1/06 |
| 2011/0313566 | A1 * | 12/2011 | Kim | B65B 39/002 |
| | | | | 221/206 |
| 2023/0106762 | A1 * | 4/2023 | Vine | B07B 1/04 |
| | | | | 53/467 |

FOREIGN PATENT DOCUMENTS

GB 2578601 A * 5/2020 ............ B07B 13/05
WO WO 2021/165673 A1 8/2021

* cited by examiner

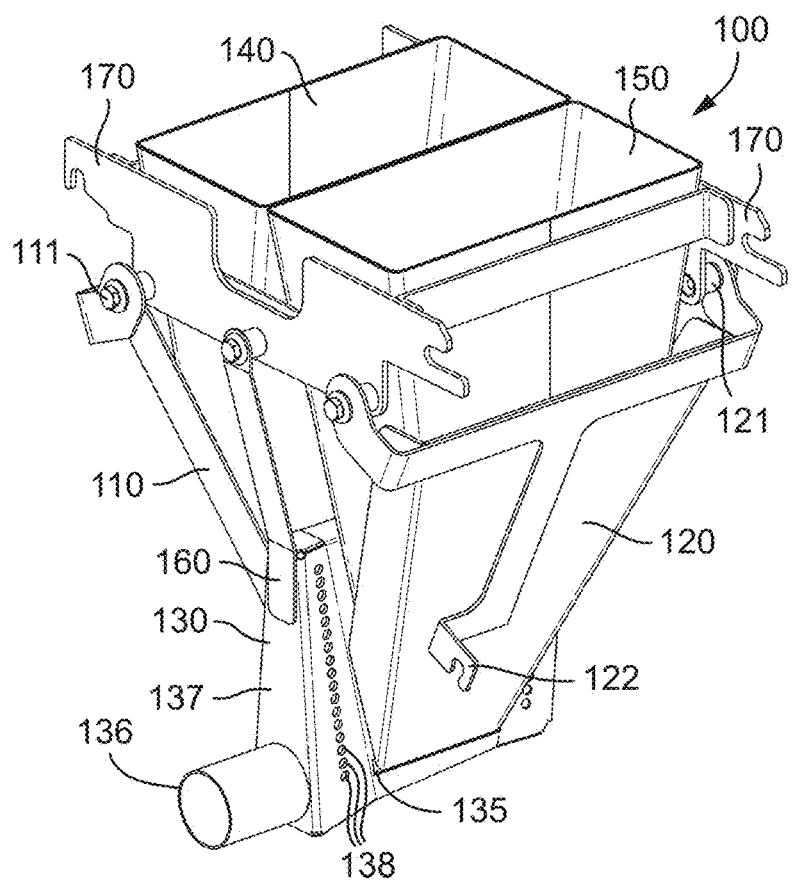
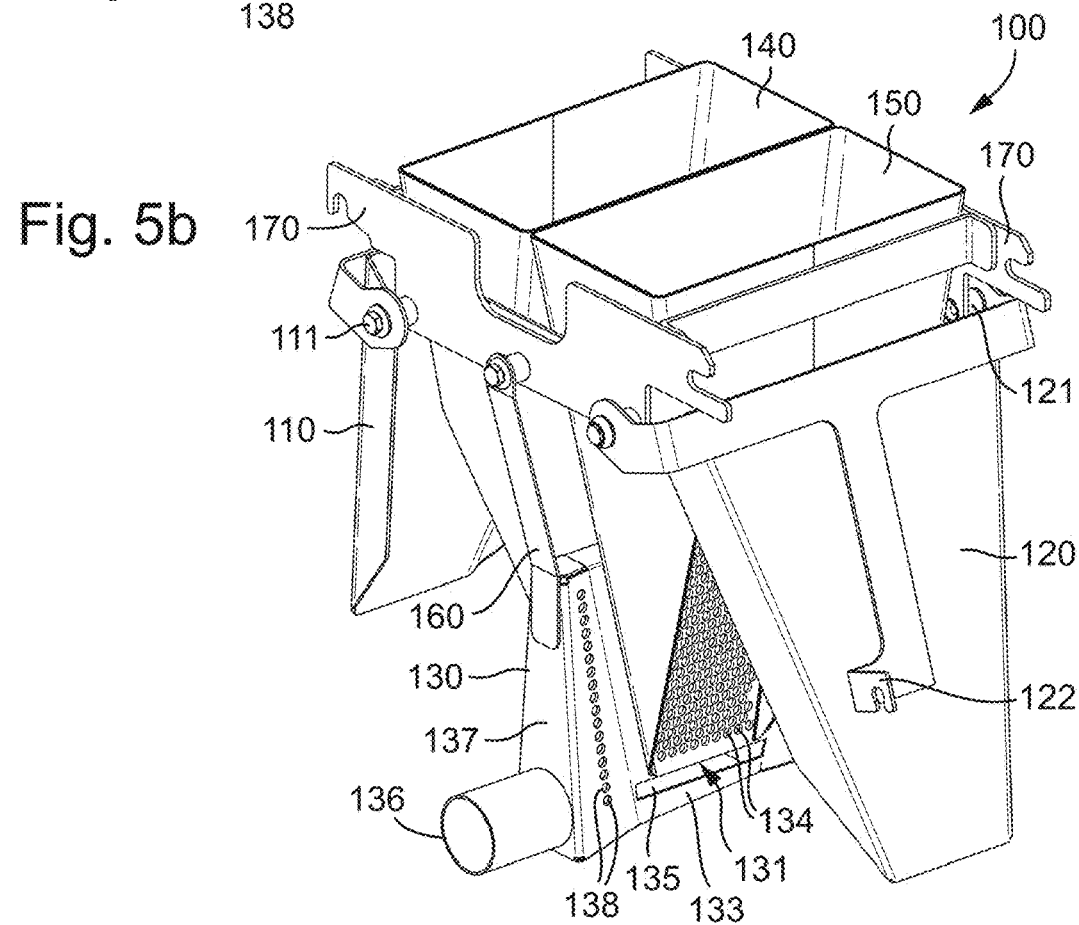

SLACK SEPARATION APPARATUS AND METHOD

CROSS-REFERENCE TO RELATED APPLICATIONS

This application is a national-stage filing under 35 USC 371(c) of International Application No. PCT/GB2023/050647, filed Mar. 17, 2023, which claims priority to, and the benefit of, Great Britain Patent Application No. GB 2203805.3 filed Mar. 18, 2022, the entire contents of each of which are herein incorporated by reference in their entirety for all purposes.

FIELD OF THE INVENTION

The present disclosure relates to devices, systems and methods for separating excess slack out of a mixture of product and slack. For example, the slack could be a food product coating such as sugar for sugared sweets, breadcrumbs for breaded products, seasoning for savoury snacks or starch powder.

More specifically, aspects of the invention relate to an improved hopper design and systems and methods using said hoppers. The apparatuses and methods according to the invention are particularly well suited for use in the food packaging industry.

BACKGROUND

Some products are packaged together with additional material, which will be referred to herein as slack. Slack, which is generally of a substantially solid or liquid form, may be mixed with solid product before the mixture is portioned into packaging. Where slack is substantially solid, its dimensions are significantly smaller than the dimensions of the product itself, often being at least five times smaller than the dimensions of the product and more typically at least an order of magnitude smaller (i.e. ten times smaller). For example, the slack may be in the form of powder or particulates.

Slack may be included in product packaging to protect the product in some way, for example from degradation due to exposure to certain chemicals or due to motion of the product within its packaging. Alternatively or additionally, slack may be included to enhance the product in some way, for example food products may be provided with loose coatings of sugar, breadcrumbs or herbs to improve their taste, texture and/or appearance. Alternatively or additionally, slack may be created during processing of a product before packaging, for instance, fragile products such as potato chips or crisps may crumble or break to form slack in the form of crumbs.

Furthermore, in some processes (for example coating processes) it may be necessary to mix a higher ratio of slack to product than is desired in the final packaged product, for example to ensure an even coating can be achieved.

Excess slack during the food production and in final, packaged products poses a number of issues.

For instance, in many products it is not desirable for excess slack to be allowed to float freely within the packaging. For example if excess breadcrumbs are floating in the packaging of a breaded food product intended for oven cooking then that excess slack could end up burning on to the oven tray.

A further problem can arise where a mixture of product and slack is dropped into packaging, which is subsequently sealed towards its upper end, as occurs in a vertical form fill seal machine (also termed a VFFS machine). If the slack falls at a slower rate than the product, for example where the product is a jelly sweet and the slack is a sugar coating, the seal quality may be compromised by slack (sugar) trapped within the seal. The sealing step can be delayed to allow the slack to settle before sealing so as to reduce the occurrence of this problem, but this approach slows processing speed and reduces output of packaged products.

Excess slack may also collect in or adhere to product handling machinery. This may result in the machinery jamming and/or cause high maintenance costs. This is especially problematic for slack commonly found in food products such as sugar, starch and fatty crumbs. Equally, the product handling machinery produces a food product, slack which is stuck in machinery for long periods may spoil or attract pests, endangering to public health.

As such, it is desirable to separate excess slack from product before packaging.

Existing apparatuses and systems for removing slack tend to be complicated to design and manufacture, require large energy input and/or are only able to remove a relatively small proportion of the slack travelling with product along a product pathway (i.e. the pathway along which a continuous product stream or sequential portions of product travel).

Therefore, there is a need for an alternative method and/or apparatus for separating excess slack from product, which preferably contributes to solving one or more of the problems discussed above.

SUMMARY OF INVENTION

The claimed invention provides improved devices, systems and methods for removing slack from product. Specifically, devices and systems according to the invention include hoppers which may be used to store, weigh and discharge product with reduced levels of slack. For instance, when used in the food industry the claimed invention is suitable for (but is not limited to) separating: loose sugar from sugared sweets; excess flavouring and crumbs from crisps or chips; breadcrumbs from breaded products; and excess marinade from raw meat products. These devices, systems and methods are capable of removing slack from product as the product moves along a product pathway within a product packaging facility and are therefore space efficient.

As used herein, "slack" will be understood to comprise a liquid and/or solids having dimensions that are significantly smaller than the dimensions of products (e.g. food products) that travels with or is mixed with products. As such, solid slack or the solids within slack comprising both liquid and solids may be separated or distinguished from the product with which they are mixed on basis of size. For example, solid slack may be in the form of powder or particulates whereas the products may be significantly larger. Solid slack may have an average dimension that is at least five times, and is more typically at least ten times, smaller than the average dimension of the products in a mixture of product and slack. In further examples solid slack may be even smaller relative to product, having dimensions that are 50 to 100 times smaller than the product. As an example, sugared sweets are often of approximately 20 to 30 mm in dimension whereas powdered sugar (also referred to as icing sugar) which can form slack may have an average particle size of approximately 0.05 mm. Breaded food products are often have dimensions in the range of 50 to 150 mm, whereas loose breadcrumbs have a dimension of approximately 0.5 to 2 mm.

According to an aspect of the invention there is provided a hopper for separating slack from a mixture of product and slack, the hopper comprising: a first gate that is moveable between respective open and closed positions; and a slack removal body; the first gate and the slack removal body being arranged such that, when the first gate is in its closed position, they define a first product receiving volume therebetween; wherein the slack removal body comprises a first internal chamber for receiving slack and a first filter wall that separates the first internal chamber from the first product receiving volume, the first filter wall being configured to prevent the passage of product therethrough, but to allow the passage of slack therethrough; wherein the first gate is configured such that: when the first gate is in its open position a first path is provided for product to exit the first product receiving volume; and when the first gate is in its closed position the first path is closed and product may be retained in the first product receiving volume; and wherein the slack removal body is configured to remain substantially stationary as the first gate is moved between its respective open and closed positions.

Removing excess slack from a product pathway (i.e. the pathway along which a continuous product stream or sequential portions of product travel) using such a hopper increases the reliability of a product handling system and improves the quality of a final product. Moreover, it will be appreciated that the invention provides a particularly quick and efficient means of removing slack from the product pathway. Slack may be removed from the product whilst product is settling within the hopper and without any significant delay to the discharging of product from the hopper. Therefore, slack may be removed from the existing flow of product or of product portions without significantly affecting the throughput of the hopper and/or the output of a wider system.

Hoppers according to the invention are particularly space efficient since the component that divides or separates the slack from the product—the slack removal body—is provided inside a hopper. In addition, hoppers in accordance with the invention may be easily retrofitted to product handling machinery, replacing existing hoppers that may be unsuitable for separating slack from product.

Furthermore, hoppers in accordance with the invention are simple to design and manufacture and have long service lifespans. This is because in use—i.e. whilst the hopper receives product, separates slack, and dispenses product— the slack removal body remains substantially stationary. There are no additional moving or dynamic parts in comparison to conventional hoppers without slack removing bodies. By substantially stationary it will be understood that the slack removal body does not move significantly in relation to the remaining components of the hopper aside from the movable first gate. Whilst vibrations may be passed to the slack removal body as the first gate is opened and closed, the slack removal body is otherwise stationary throughout use. As such, in use the slack removal body may be fixed relative to the remaining components of the hopper. The slack removal body may be unpowered and not directly connected to any actuator.

The hopper will separate slack from product when the first gate is in its closed position and a mixture of product is provided (i.e. introduced) into the product receiving volume. For instance, product or an existing mixture of product and slack may be introduced through an opening to the product receiving volume. Such an opening is preferably positioned at an upper portion of the hopper so that product may enter or fall into the hopper under gravity. In this arrangement slack will pass from the product receiving body into the first internal chamber of the slack removal body where it can be subsequently collected or discharged. The excess slack separated and collected using the device may be reused, being reintroduced to the production line upstream of the device so as to reduce waste. The product (and any remaining slack) retained in the product receiving volume may subsequently be discharged or allowed to exit the hopper by opening the first gate. As such, it will be seen that the product introduced to the product receiving volume whilst the first gate is closed will remain within the product receiving volume until the first gate is opened.

The amount of slack removed from a mixture of product and slack by the hopper may depend on the length of time that the mixture spends in the hopper (i.e. the "dwell time" of product in the hopper). Similarly, the proportion of slack removed by the hopper may depend on the specific product and slack in question. For instance, in preferred implementation at least 15% of slack by weight and/or volume may be removed from the mixture introduced into the hopper, more preferably 25%, more preferably still 50%, and more preferably still 75%, even more preferably 95%.

It is particularly beneficial to remove slack from a mixture of product and slack at a hopper in comparison to at other stages of a production line. This is because the product may experience a significant drop or fall into the hopper (e.g. from a product feed device such as a dispersion feeder, screw feeder, conveyor or any other suitable machine). This drop may create substantial amounts of slack as the product hits or collides with the hopper. Therefore, devices according to the invention may remove slack promptly after it is created and before it is transferred to downstream product handling machines or before the product is dispensed into a package of a packaging machine. In particular, it may be desirable to provide a slack removal hopper as the final hopper before the food product is dispensed into a package of a packaging machine. This is because slack is typically created each time the product hits or collides with a surface such as the inside of a hopper. A single slack removal hopper provided as the final hopper before packaging (i.e. as the final hopper before a packaging machine) may thereby act to remove all slack at the last instance at which significant slack is created, minimizing the amount of slack in the final packaged product. For example, the slack removal hopper may dispense product along the first path, which may lead directly or indirectly into a package of a packaging machine. For example, the product may fall directly from the hopper into a package, or may be conveyed along one or more funnels or chutes into the package. Such final hoppers are often referred to as timing hoppers since they may dispense their contents at fixed timings to correspond to the operation of subsequent packaging machines (e.g. a bagmaker or vertical fill form seal VFFS machine).

In general the hopper may receive a series of portions of product, each of which contains one or more product items. The division of a continuous product stream into portions may be performed by a preceding feed device such as a computer controlled weigher or a volumetric filling device. However, alternatively, the hopper may itself act to portion a substantially continuous product stream-one or more product items may be accumulated together within the product receiving volume before being discharged (i.e. dispensed or released) together along the first path by opening the first gate.

The first gate may move between its respective open and closed positions by rotation about a hinge (e.g. a respective hinge). Alternatively the first gate may slide between their respective open and closed positions. The first gate may be driven by any suitable motor or actuator, such as a harmonic drive (also termed a harmonic gear motor), a linear servo motor or pneumatic actuator.

The slack removal body is preferably a hollow body, comprising the first internal chamber for the collection of slack that passes through the first filter wall. The internal chamber is a volume defined or enclosed within the slack removal body.

Preferably the slack removal body is detachable, and may be removed from the remaining components of the hopper. In other words, the slack removal body is preferably detachably fixed (i.e. connected) to the remaining components of the hopper. As such, whilst the slack removal body may remain stationary during use, the body may be removed or taken away from the hopper for emptying, cleaning and/or maintenance. For instance, the slack removal body may be periodically switched or exchanged with a fresh slack removal body.

Preferably the slack removal body is coupled to the remaining components of the hopper by a mechanism that is configured be manually operated to release the slack removal body without the requirement for tools. Such mechanisms can be referred to as quick release mechanisms. In some embodiments the quick release mechanism may comprise a latch, clip or clamp. However, in a particularly preferred example the slack removal body is connected to the remaining components of the hopper by a bolt or screw that comprises a lever handle attached to the head of the bolt or screw such that the bolt or screw may be engaged and released by hand. However, in alternative examples the slack removal body may be bolted or screwed to the remaining components of the hopper using conventional bolts and screws. These bolts and screws may be released with a screwdriver, spanner or socket wrench.

In further examples, the slack removal body may be permanently attached to other components of the hopper—e.g. the slack removal body may be welded, rivets or formed continuously with further components of the hopper. For example, the slack removal body may be welded to one or more chutes through which product and slack are introduced to the hopper and/or welded to one or more hinges about which the gate or gates to the hopper rotate.

Preferably, the first internal chamber of the slack removal body comprises an opening through which slack may be removed. Thus slack collected in the first internal chamber may be discharged from the slack removal body whilst the slack removal body is in position within the hopper—e.g. during use. For instance, slack may be removed continuously or periodically through the opening. However, alternatively the first internal chamber of the slack removal body could be removed from the slack removal body so that it may be emptied and/or cleaned (as discussed above). The opening is preferably separate from any apertures in the filter wall and may be provided in a different wall of the slack removal body from the filter wall.

In particularly preferred embodiments the first path along which product may exit the hopper when the first gate is opened is angled and/or laterally offset from the path along which slack may exit the first internal chamber through the opening discussed above. This reduces the risk that slack separated from a mixture of product and slack in the hopper may accidentally re-enter the production line.

Preferably the opening of the first internal chamber is configured to connect to a vacuum pump arranged to remove slack from the first internal chamber. Providing a vacuum pump to collect slack from the first internal chamber of the slack removal body is a convenient and automatic means for emptying the first internal chamber. There is also a reduced risk that slack accumulates in or clogs the first internal chamber.

In preferred embodiments, a vacuum pump may be provided that is sufficiently strong to exert a suction force to the contents of the first product receiving volume so as to pull slack into the first internal chamber of the slack removal body. In alternative embodiments the internal chamber may be emptied manually. As such, there may be provided a system including a hopper and a vacuum pump.

The vacuum pump may be rated at between 2 and 8 KW and more preferably between 4 and 6 KW. Preferably the vacuum pump is explosion proof, especially where the slack is a particulate or powder such as sugar. In some examples the vacuum pump may be central vacuum pump within a larger factory or system. In these cases a single vacuum pump may be configured to couple to multiple pieces of machinery, and potentially configured to couple to two or more hoppers.

Preferably the opening is provided in or at a base surface of the first internal chamber. As such, slack may be easily removed from the internal chamber since slack will typically accumulate at the base of the internal chamber under gravity.

Preferably the base surface of the first internal chamber is angled towards the opening, so that slack will tend to travel along the first internal chamber towards the opening under gravity. As such, it will be understood that the base of the trough is not parallel to either a horizontal or vertical axis when in use. Slack may flow along the base of the trough towards the opening. This is especially effective where the slack is in the form of a liquid or fine particulates or powder. Thus slack will tend to exit the first internal chamber under gravity and may reduce (for instance) the suction force required to empty the first internal chamber. Hence collection of slack from the first internal chamber is simplified. Nevertheless in further examples the trough may comprise a base which is not angled and extends in a substantially horizontal direction in use.

Combining an angled base surface and a vacuum pump is particularly effective since slack is very likely to travel across an angled surface under a suction force. This simplifies collection of slack.

Preferably the first filter wall comprises one or more apertures, each of the apertures being sized to permit slack to pass therethrough but to prevent the passage of product therethrough. Therefore, slack may pass through the apertures (i.e. holes or perforations extending entirely through the first filter wall), whereas product cannot. It will be appreciated that a plurality of apertures may be arranged in a wide variety of layouts across the surface of the filter wall. Furthermore, the apertures may take a wide range of sizes and shapes. The apertures may be designed to suit the combination of product and slack with which the hopper is to be used.

Preferably at least one dimension of the apertures is smaller than a minimum dimension of the product with which the hopper is intended for use. Therefore, product may not pass through the apertures. Equally preferably, the dimensions of the apertures can be selected to be greater than the maximum dimensions of the slack so that slack may pass through the apertures.

For instance, the minimum dimension (i.e. the smallest dimension) of each of the apertures in the plane filter wall is preferably in the range of 0.1 cm to 1 cm, and preferably within the range of 0.1 cm to 0.5 cm. The term "minimum dimension" is understood as meaning the smallest dimension of the aperture in the plane of the first filter wall. For instance, if an aperture is circular, its minimum dimension is the diameter of the aperture. Whereas, if an aperture is elongate, its minimum dimension is its width perpendicular to the direction in which it extends.

The dimensions discussed above are suitable for a broad range of applications, and are particularly well suited for the food packaging industry. For instance, filter walls which comprise apertures having at least one dimension in the range from 1 cm to 0.1 cm are well suited for separating loose sugar from sugared sweets, excess flavourings from crisps and chips, and excess marinade from marinated meat products. Nevertheless apertures with alternative dimensions may be selected for alternative mixtures of product and slack.

In preferred examples the first filter wall may comprise a filter, mesh, grating, grill, gauze, sieve or net. As such, the first filter wall may comprise a plurality of apertures arranged in a regular or irregular array. Thus at least a portion of the filter wall is formed as a filter, mesh, grating, grill, gauze, sieve, net or other suitable structure.

In contrast the remaining walls of the slack removal body, the first gate and other components of the hopper that define the product receiving volume are preferably continuous—e.g. being formed of continuous sheet material. For instance, these components and walls may be constructed of sheet or plate metal without apertures or holes extending through it. Thus these components will prevent the passage of both product and slack therethrough.

In preferred examples the first filter wall comprises a slot therethrough, the slot being sized to permit slack to pass therethrough but to prevent the passage of product; and wherein, when the first gate is in its closed position, the first gate is arranged such that a free edge of the first gate is adjacent to and/or enters the slot and such that an internal surface of the first gate is angled towards the slot so that slack will tend to travel along the first gate under gravity towards the slot. Therefore, slack may enter the first internal chamber from the first product receiving volume through the slot in the first filter wall. Slack within the product receiving region will tend to fall under gravity to the internal surface of the first gate and will tend to slide or travel along the angled first gate to the free end of the gate and into the first internal chamber through the slot. By angled it is understood that the first gate is configured such that in use and when in its closed position the internal surface is not parallel to either a horizontal or vertical axis and instead slopes down towards the slot. The free edge of the first gate is understood as an edge that is not secured at either end. For instance, the free edge may be at the opposite end of the first gate to a hinge about which the first gate pivots. Therefore, the slot is preferably arranged in a position in the first filter wall at which the first gate and the first filter wall would intersect when the first gate is in its closed position if the slot was not present and/or the first gate was greater in length. Such a slot may be provided in combination with other apertures in the first filter wall. However, this is not essential and the first filter wall may comprise the slot alone as a single aperture for the removal of slack.

This slot and the arrangement of the hopper discussed above offers particular benefits for the removal of slack which may not be immediately apparent without consideration of how slack and product move. In many combinations of product and slack—especially examples where the slack comprises a powder or particulate—the slack tends to fall under gravity faster than the products. The relatively large products tend to be slowed down as they collide with themselves and the surfaces of any passageway or chute through which they are travelling. Therefore, when a mixture of product and slack is dispensed to the hopper higher concentrations of slack and reduced amounts of product are present in the lowest (i.e. earliest) section of the mixture. With reduced levels of product, the slack in this initial section of the mixture to hit the angled internal surface of the first gate and is quickly directed to the slot and into the slack removal chamber before the majority of product settles into the product receiving volume.

The slot may comprise a plurality of projections that extend from a long edge of the slot towards the opposing edge of the slot. As such, the projections form "teeth" that extend across a portion of the slot. The teeth perform a filtering action, preventing the passage of large objects (e.g. product) whilst allowing the passage of smaller objects (e.g. slack). The projections may extend across at least 25% of the width of the slot, more preferably at least 40% of the width of the slot, more preferably still at least 50% of the width of the slot.

Moreover, since the internal surface of the first gate is angled towards the first filter wall the product receiving volume will have a substantially triangular cross section. As such, relatively little product can settle near the slot within the vertex or point of this triangular cross section. Therefore, slack is relatively free to pass across the internal surface of the first gate, through the slot and into the slack removal body.

Preferably the slot is wider than the free edge of the first gate, such that slack travelling across any point across the width of the first gate may easily enter the slack removal body. In other words, the slot extends continuously across the whole width of the free end of the first gate when the first gate is in its closed position, so that there is no impediment to the passage of slack along the width of the free end of the first gate.

In preferred examples, when the first gate is in its closed position it is angled towards the first filter wall and forms an angle of less than 45 degrees relative to the vertical axis, more preferably less than 40 degrees, more preferably still less than 30 degrees. Where the first gate is provided at steeper angles slack is more likely to flow across its surface towards the first filter wall. As such, steeper angles may allow for increased removal of slack, especially when handling solid slack.

In particularly preferred examples the hopper may comprise one or more external apertures that extend between the first internal chamber and the exterior of the hopper when the first gate is in each of its open and closed positions, the external apertures being sized to permit slack to pass therethrough but to prevent the passage of product therethrough, such that airborne slack outside of the hopper may enter the slack removal body via the external apertures.

The external apertures resolve an issue that has been recognised when handling slack in the form of fine powders or particulates such as icing or powdered sugar. When the gates of hoppers handling these fine powders open and close they tend to create clouds of airborne slack. The fine slack is ejected from the hoppers due to the dynamic forces involved. Thus clouds of airborne slack can exist around the hoppers in use. External apertures extending between the exterior of the hopper and an internal chamber of the slack removal chamber allows for this airborne slack to be collected into the internal chamber.

The external apertures of the slack removal body offer particular benefits in combination with a vacuum pump that is connected to an opening of an internal chamber. Suction forces may be applied by the vacuum pump to the air surrounding the hopper through the external apertures. As such, airborne slack in the air surrounding the hopper will be collected and sucked into the internal chamber. The slack collected in this way can then be disposed of or reused as appropriate.

For example the external apertures may be formed into an external wall of the slack removal chamber that separates the first internal chamber from the exterior of the hopper and thus defines a portion of the exterior of the hopper regardless of the position of the gate of the hopper. In preferred examples, the slack removal body is wider than the first gate such that the external wall of the slack removal body projects laterally beyond the boundaries of the first gate. As such, greater proportion of airborne slack may be removed from the air surrounding the hopper.

In preferred examples the external wall and the filter wall of the slack removal body are continuous and/or coplanar. However, this is not essential and in other examples these wall may be arranged perpendicular to one another.

Preferably the hopper is configured such that vibrations from opening and/or closing the first gate are transmitted to the slack removal body and its contents. As such, slack within the slack removal body will experience vibration forces and will be agitated by the movement of the first gate. As such, slack is less likely to form solid clumps or masses. In embodiments where the slack removal chamber has an opening for slack to be discharged through and/or a sloped base surface the vibrations may also prompt the slack to move across the slack removal chamber towards the opening. As such, in these examples the slack removal body is easier to empty.

In preferred examples the first gate comprises side walls that, when the first gate is its closed position, are positioned on either side of the first product receiving volume and wherein the side walls of the first gate are configured to contact the slack removal body when the first gate is its closed position. As such, the first product receiving volume may be defined between the filter wall of the slack removal body, the side walls of the first gate and other portions of the first gate. By contacting the filter walls, the side walls may prevent product and slack from leaving the first product receiving region when the first gate is closed. In addition, when the first gate is closed and its side walls are brought into contact with the filter wall of the slack removal body vibrations may be transferred to the slack removal body.

In particularly preferred embodiments the hopper may be configured to open and/or close the first gate in two discrete steps. Therefore, the opening and/or closing involves two separate movements with a gap or pause between. For instance, the hopper may be configured to close the first gate in a first closing step in which the first gate is moved to an intermediate position between its open and closed positions, and a subsequent, second closing step in which the first gate is moved from the intermediate position to its closed position. The gate is held substantially stationary for a period at the intermediate position between the first and second closing steps. The period of time between the two closing steps may be at least 100 ms, preferably at least 200 ms, more preferably still at least 400 ms. This two-step process in which the movement of the first gate is paused as it moves between the open and closed portions (or between the closed and open positions) is highly dynamic and can transfer significant vibrations to the slack removal body and its contents. Thus slack may be transferred towards the opening (s) in the first internal chamber discussed above for removal. In preferred embodiments the intermediate position is closer to the closed position than the open position. In particularly preferred embodiments the intermediate position is in a location that is in range of 75 to 100% of the total distance or angle from the open position to the closed position, more preferably 90 to 98%, more preferably 94 to 96%. This arrangement of the intermediate position close to the closed position ensure high levels of force is transferred to the slack removal body, especially when using a harmonic drive motor.

The first gate, slack removal body and/or any other components of the hopper may be formed of metals such as stainless steel, steel and aluminium, alloys, plastics or composites (although any other suitable material may be used). In preferred examples the gates and walls of the hopper may be constructed from folded stainless steel (but this is not essential). Where the hopper is intended for use in the food packaging industry preferably the components are constructed from a food safe material. The hopper may be formed of a plurality of layers of material. For example, each filter wall may comprise one or more layers of material that are fixed together.

In some examples the surface roughness Ra (i.e. the mean deviation of the surface) of the first gate, the slack removal body, and/or any further components or walls of the hopper may be less than 10 μm, more preferably less than 5 μm, more preferably less than 2 μm. In particularly preferred examples the surface roughness may be less than 1.6 μm. Materials with low surface roughness may prevent product and/or slack from sticking or adhering to the hopper. Additionally, or alternatively, the first gate, the slack removal body, and/or any further components or walls may be provided with a surface relief configured to reduce friction between the hopper and product and/or slack, so as to prevent product and/or slack from adhering to the surface of the hopper. Nevertheless, in further examples it may be desirable to leave the surface rough.

In some embodiments the hopper may comprise a chute or surface that is configured to direct the mixture of product and slack towards the first filter wall as the mixture enters the product receiving volume, such that the mixture contacts the first filter wall at a substantially perpendicular angle. Alternatively, a feed device or other component located upstream of the hopper may be configured to direct or dispense the mixture into the hopper at a substantially perpendicular angle relative to the first filter wall. For example, the product and/or slack may contact the first filter wall when travelling along paths with an average angle that is greater than 45 degrees relative to the surface of the first filter wall, more preferably greater than 60 degree, more preferably still greater than 75 degrees. By arranging the hopper such that a mixture impacts the wall at these relative high angle the proportion of slack that is removed through the first filter wall may be increased. However, this is not essential.

In particularly preferred embodiments the hopper has multiple moveable gates (e.g. a first gate and a second gate) and two corresponding product receiving volumes (e.g. a first product receiving volume and a second product receiving volume). The product receiving volumes may be separated by at least one wall of the hopper and/or slack removal body, such that product that is introduced into the first product receiving volume may not enter the second product receiving volume, and vice versa.

Providing a hopper with multiple product receiving volumes that are opened and closed by separate gates provides increased flexibility and can allow for the throughput of product to be increased without a corresponding increase in the size of the hopper.

A significant delay in the operation of hoppers with a single gate is associated with so-called settling time as a mixture of product and slack is first introduced into the hopper. Time is required for the product to enter and settle in the hopper, and for slack to be separated from the mixture. To increase throughput, product may be alternately dispensed from the different product receiving volumes. Such that whilst a first product receiving volume is being filled with a mixture of product and slack and is separating the slack out of said mixture with its corresponding gate closed, the second product receiving volume has its gate opened to dispense product from which slack has already be removed (and vice versa). This staggered, alternating operation of the gates and product receiving volumes allows for large amounts of slack to be removed from each portion of the product and slack mixture without a significant delay between consecutive portions dispensed by the hopper.

Alternatively, the gate may be controlled such that they are operated separately or together depending on (for instance) the weight of their contents or the desired portion size to be dispensed. This increased flexibility is not be possible for hoppers with a single product receiving region and single gate.

In more detail, preferably the hopper comprises: a second gate that is moveable between respective open and closed positions; the second gate and the slack removal body being arranged such that, when the second gate is in its closed position, they define a second product receiving volume therebetween; and wherein the second gate is configured such that: when the second gate is in its open position a second path is provided for product to exit the second product receiving volume; and when the second gate is in its closed position said second path is closed and product may be retained in the second product receiving volume. Thus product will be retained in the first and second product receiving volumes and will remain substantially stationary whilst the respective gates are closed.

Preferably, the hopper is also configured to remove slack from a mixtures of product and slack that are introduced to the second product receiving volume.

Indeed, in particularly preferred embodiments, the first and second gates are opposed and the slack removal body is positioned between the opposed first and second gates; wherein the slack removal body comprises a second internal chamber for receiving slack and a second filter wall that separates a second internal chamber from the second product receiving volume, the second filter wall being configured to prevent the passage of product therethrough, but to allow the passage of slack therethrough. Therefore, slack may be removed from the second product receiving volume and retained in the second internal chamber of the product in a similar manner to slack from the first product receiving volume.

In such examples the two moveable gates are opposed, with the slack removal body positioned therebetween. As such, the hopper may be symmetric about a centreline extending through the slack removal body (assuming the first and second moveable gates are arranged in corresponding positions). The two halves of the hopper may be operated simultaneously or alternately. However, in further examples the product receiving volumes and gates may be provided in further arrangement—e.g. linearly on the same side of a slack removal body.

In preferred examples, the first internal chamber and the second internal chamber of the slack removal chamber are the same chamber. In other words, the slack removal body comprises a single internal chamber into which slack from both the first receiving volume and the second receiving volume may enter through the respective first and second filter walls.

Providing a slack removal body between the two product receiving volumes is space efficient. Furthermore, removing slack via the same internal chamber is quick and easy. Moreover, since the slack removal body in these examples is central within the hopper there is less risk that slack might escape or be released from the internal chamber of the slack removal body and unintentionally re-enter the production line.

In some embodiments the slack receiving body comprises an internal baffle within its single internal chamber, the internal baffle being configured to prevent slack from entering the internal chamber through the first filter wall and immediately exiting through the second filter wall, or from entering through the second filter wall and leaving via the first filter wall. The internal baffle may be positioned between the first and second filter walls, and is configured to prevent the passage of slack therethrough (e.g. being formed of a continuous sheet materials). As such, the internal baffle separates or isolates the paths of the slack entering the slack removal body from the respective filter walls. The internal baffle may extend vertically and along a centreline of the slack receiving body.

The second gate, the second product receiving volume, the second filter wall and the second internal chamber (if separate from the first internal chamber) may comprise any of the features and offer any of the corresponding benefits discussed above in reference to the first gate, the first product receiving volume, the first filter wall and the first internal chamber respectively. Similarly, the second gate and second product receiving volume may be operated in accordance with the steps discussed above with reference to the first gate and the first product receiving volume.

Preferably the different paths (the first and second paths) along which product is dispensed from are parallel. In preferred examples the product dispensed along the first and second paths is transferred to the same downstream apparatus—e.g. to the same packaging machine. However, these features are not essential and product from each product receiving region may be directed or transferred to different locations. For example the product dispensed through the separate gates could be directed down different discharge paths—e.g. into different infeeds of a twin bagmaker or double lane box or tin can machine.

Preferably the hopper is a hopper suitable for use in a computer controlled weigher, a multihead or combination weigher, a linear weigher, a cup filler and/or a volumetric filling device. For instance, the hopper may be suitable for use in a combination weigher (also commonly referred to as a multihead weigher). Such devices provide quick and efficient portioning of a product stream into individual portions for packaging.

For instance, the hopper may be a timing hopper, weigh hopper, pool hopper, booster hopper, output hopper or discharge hopper. Use of the hoppers according to this aspect of the invention as timing hoppers—the final hopper before product is passed to packaging machine in many food packaging systems-is particularly beneficial since slack may be removed from the product immediately before the product is packaged. Timing hoppers dispense their contents periodically, typically at fixed intervals, in correspondence with downstream packaging machines (or other machines). As discussed above, removing slack from the final hopper before packaging (i.e. as the final hopper before a packaging machine) helps remove all slack at the last instance at which significant slack is created, minimizing the amount of slack in the final packaged product and/or the slack trapped in the seams of a packaged product.

According to a further aspect of the invention there is provided a system comprising: one or more hoppers according to any preceding claim; and a computer controlled weigher and/or a packaging machine.

Where the system comprises a computer controlled weigher, the hopper may be a hopper within the computer controlled weigher, may be configured to dispense product to the computer controlled weigher or may receive product from the computer controlled weigher.

In preferred examples the computer controlled weigher is a combination or multihead weigher, a linear weigher, a cup filler or a volumetric filling device. These are all examples of suitable feed devices for the hoppers and systems discussed above. Such weighers are particularly quick and efficient at dividing a continuous product stream into product portions of consistent weight. However, other weighers or feed devices may also be used.

In preferred examples the packaging machine is a bagmaker, a vertical fill form seal, VFFS, machine, a box filling machine, a cartoniser or a can filling machine. However, other packaging machines may be provided. The bagmaker or VFFS machine are preferably configured to receive product from the hopper.

Most preferably the hopper is a timing hopper provided between the computer controlled weigher (the feed device) and the packaging machine. In such cases the computer controlled weigher (feed device) may dispense product to the hopper, and subsequently the hopper may dispense product to the bagmaker or VFFS machine. Slack may travel to the hopper with product dispensed from the computer controlled weigher (feed device) and/or slack may be generated as it enters the hopper. In each case slack may be removed from the mixture of product and slack within the hopper through the method described above.

In preferred examples the system comprises a vacuum pump. The vacuum pump, as discussed above, may be connected to or is configured to connect to an opening in an internal chamber of the slack removal body (e.g. the first and/or second internal chambers discussed above) so as to remove slack from said internal chamber. The vacuum pump may be configured to operate continuously or periodically. In preferred examples the vacuum pump may be sufficiently powerful to provide suction forces to pull airborne slack from the exterior of the hopper into the first and/or second internal chamber of the slack removal body via apertures or holes in the exterior wall of the slack removal body.

Systems according to this aspect of the invention offer corresponding benefits and may comprise any of the features discussed above with reference to the hoppers of the preceding aspect of the invention. They provide a compact and efficient means of removing slack from a packaging system.

Preferably the system is a product packaging system, more preferably a food product packaging system. For instance the system may be configured to portion and/or package sweets, crisps, chips and other food products.

According to a further aspect of the invention there is provided a method of separating slack from a mixture of product and slack using a hopper or a system in accordance with the preceding aspects of the invention, the method comprising the steps of: (a) providing a mixture of product and slack into the first product receiving volume of the hopper when the first gate is in its closed position, such that product is retained within the first product receiving volume and such that at least some slack from the mixture passes through the first filter wall and into the first internal chamber of the slack removal body; (b) moving the first gate of the hopper into its open position such that the remaining contents of the first product receiving volume exit the hopper.

As such, methods in accordance with the invention quickly and efficiently remove excess slack from a mixture of product and slack and dispense product with reduced levels of slack. Whilst the mixture is in the hopper slack will tend to pass through the first filter wall and will be retained in the first internal chamber of the slack removal body. The dwell time of the mixture within the hopper—i.e. the time between introducing the mixture into the hopper and the opening of the first gate to dispense the product—may be adjusted to control the amount of slack to be removed from the final product.

The slack removal body preferably remains substantially stationary throughout the method. As such, preferably the slack removal body does not move significantly as the first gate is opened and closed.

Herein, the act of "providing a mixture of product and slack into a product receiving volume of a hopper" is understood to refer to at least situations in which: a mixture of product and slack is introduced (i.e. dispensed) into the product receiving volume; and/or slack is generated as product is introduced into the product receiving volume. In the first of these situations product is dispensed to the hopper together with slack—i.e. the mixture of product and slack is generated upstream of the hopper such that. Whereas, in the second situation slack is generated as the product enters the hopper—for example products may be damaged as they falls into the hopper thereby fragmenting and creating slack.

The method may further comprise: (c) moving the first gate into its respective closed position; and wherein the method comprises repeating steps (a) to (c). As such, the method may be performed iteratively to remove slack from consecutive portions of products ahead of packaging.

In preferred examples step (c) comprises two discrete closing steps: a first closing step in which the first gate is moved to an intermediate position between its open and closed positions; and a subsequent, second closing step in which the first gate is moved from the intermediate position to its closed position. The first and second closing steps are distinct and consecutive. As such, the first gate is held stationary between the two closing steps for a predetermined period of time—e.g. a period of at least 100 ms. This two-step process is dynamic and can transfer significant vibrations to the slack removal body from the gate. Thus slack within the slack removal body may be transferred towards the opening(s) in the first internal chamber discussed above for removal. In preferred embodiments the intermediate position is closer to the closed position than the open position. In particularly preferred embodiments the intermediate position is in a location that is in range of 80 to 100% of the total distance or angle from the open position to the closed position, more preferably 90 to 98%, more preferably 94 to 96%. This arrangement of the intermediate position close to the closed position ensure high levels of force is transferred to the slack removal body, especially when using a harmonic drive motor.

In preferred examples steps (a) and (b) are performed at least 100 ms apart, preferably at least 200 ms apart, more preferably still at least 400 ms apart. These figures provide appropriate dwell times for slack to be removed from a mixture when handling a wide range of products. In particular these times are appropriate for many mixtures containing food products such as sugared sweets. As discussed above, a large delay can ensure larger proportion of slack is removed from the mixture of product and slack. However, where the hopper is repeatedly dispensing product into a package of a packaging machine, it is desirable to ensure that each iteration of step (c) occurs at most 1000 ms after the preceding iteration of step (c), preferably at most 800 ms after the preceding iteration of step (c), more preferably at most 600 ms after the preceding iteration of step (c), most preferably at most 500 ms after the preceding iteration of step (c). Reducing the delay between each iteration helps to maintain overall throughput through the system and this is of particular importance where the hopper acts as a bottleneck by being the hopper that dispenses into package of a packaging machine. A preferred range would be each iteration of step (c) occurring between 200 ms and 800 ms after the preceding iteration of step (c), preferably between 400 ms and 600 ms.

Alternatively, or additionally, the method may comprise: (i) obtaining a time series of weight measurements of the contents of the hopper and/or the first product receiving volume; (ii) making a determination, based on the weight measurements, that the weight of the contents has stabilised; and wherein step I is only performed once said determination has been made. As such, the first gate is only opened once the contents of the first product receiving volume have settled and reached a (sufficiently) steady state. For example, weight measurements may be taken continuously or periodically (e.g. every 10 ms). In further examples a weight measurement may be take at least every 0.5 s, preferably at least every 0.25 s, more preferably still at least every 0.1 s, more preferably still at least every 0.05 s. The weight of the contents of a particular hopper could be determined to have stabilised if two or more consecutive measurements are of the same value (e.g. three consecutive measurements), and/or if the difference or range between two or more consecutive measurements is less a predetermined value (e.g. below 1 g, more preferably below 0.5 g, more preferably still below 0.15 g or below 1% of the total weight of the contents of the hopper, more preferably below 0.5%).

In preferred examples the method may comprise: (d) collecting the slack received by the slack removal body. Thus in this step slack is removed or discharged from the slack removal body.

In particularly preferred examples this step may comprise operating a vacuum pump to collect slack from the slack removal body. Such a vacuum pump may be connected to an opening in the first internal chamber of the slack removal body that is separate from any apertures in the filter wall(s) through which slack may enter the first internal chamber from the product receiving volumes, but this is not essential. The vacuum pump may be operated continuously or periodically. For example the vacuum pump may be operated each cycle of the method, or once every five or ten cycles. This may depend on the slack in question. Alternatively, slack may be removed and collected manually—e.g. by removing the slack removal body from the hopper for cleaning.

In particularly preferred examples the method comprises reintroducing the slack into the product production process at an upstream location. In other words, the separated slack may be reused by upstream machinery. This can avoid waste and is especially useful when the slack is a coating. For instance, sugar removed from a mixture of sugared sweets and sugar can be used to coat more sweets. Similarly excess breadcrumbs or marinade that have not adhered to a product can also be reused.

Preferably the method is performed using a hopper comprising: a second gate that is moveable between respective open and closed positions; the second gate and the slack removal body being arranged such that, when the second gate is in its closed position, they define a second product receiving volume therebetween; and wherein the second gate is configured such that: when the second gate is in its open position a second path is provided for product to exit the second product receiving volume; and when the second gate is in its closed position said second path is closed and product may be retained in the second product receiving volume. and wherein the method further comprises: (e) providing a mixture of product and slack into the second product receiving volume of the hopper when the second gate is in its closed position, such that product is retained within the second product receiving volume and such that at least some slack from the mixture passes through a second filter wall and into a second internal chamber of the slack removal body (which may or may not be the same as the first internal chamber); (f) moving the second gate of the hopper into its open position such that the remaining contents of the second product receiving volume exit the hopper; and wherein steps (b) and (f) are performed separately or simultaneously.

As discussed above, providing hoppers with multiple gates and product receiving volumes allows for higher throughput and when the product receiving volumes are alternately filled and discharged. Equally, multiple product receiving volumes and gates provides increased flexibility since it is possible to control whether the gates are operated simultaneously or independently (e.g. based on weight and/or contents of the product receiving volumes).

It will be appreciated that method steps (e) and (f) performed using the second product receiving volume and the second gate correspond to method steps (a) and (b) performed using first product receiving volume and the first gate. Moreover, these steps may comprise any of the optional or preferable features discussed above with reference to steps (a) and (b) and offer corresponding benefits. For instance, steps (e) and (f) may be performed at least 100 ms apart, preferably at least 200 ms apart, more preferably still at least 400 ms apart and/or step (f) may only be performed once weight measurements of the weight of the hopper and/or the second product receiving volume indicate that the weight of the contents has stabilised.

The method may also comprise the additional step of detaching the slack removal body from hopper (i.e. from the remaining components of the hopper). The slack removal body which has been removed in this manner may be subsequently cleaned or repaired. Furthermore, the original slack removal body may be replaced with a different slack removal body such that the hopper and system may continue to function whilst the original slack removal body is maintained.

In particularly preferred examples the method comprises transferring product discharged from the hopper in step (b) or (f) into an item of packaging and sealing the item of packaging. For example the product may be dispensed to a packaging machine such as a bagmaker, VFFS machine, box filling machine, cartoniser or can filling machine. The packaged product will have significantly reduced levels of slack when compared to product that has not passed through the hoppers and systems discussed above.

The mixture of product and slack introduced into the product receiving volume(s) may be received from a computer controlled weigher such as a combination or multihead weigher, a linear weigher, a cup filler or a volumetric filling device. Other feed devices could alternatively be used.

According to a further aspect of the invention there are provided slack removal bodies suitable for use in the hoppers and systems discussed above with reference to the preceding aspects of the invention. As discussed above, the slack removal bodies may be detachably connected (i.e. fixed) to the remainder of the hoppers. Therefore, a slack removal body can be provided separately from the remaining components of the hoppers. The slack removal bodies in hoppers according to the invention may be replaced and interchanged as necessary.

Therefore, it will be seen that the aspects of the invention discussed above offer improved devices, systems and methods for the removal of slack from a mixture of product and slack. These devices, systems and methods are well suited for use in food packaging.

BRIEF DESCRIPTION OF DRAWINGS

The invention will now be described with reference to the following drawings:

FIGS. 5a to 5f show a further hopper in accordance with the invention, of these, FIGS. 5a and 5b show the hopper in isometric perspective, FIGS. 5c and 5d show the hopper from a side view and FIGS. 5e and 5f show the hopper in cross section; in addition, FIGS. 5a, 5c and 5e show the hopper with its gates in a closed arrangement, whereas FIGS. 5b, 5d and 5f show the hopper with its gates in an open arrangement;

FIG. 7a shows a perspective view of the exterior of a slack removal body, and FIG. 7b shows the hopper from the same perspective but in a cut-away view showing the interior of the slack removal body.

DETAILED DESCRIPTION

FIGS. 1a to 1d show schematic cross sections of a hopper 10 with an internal slack removal body 20. This hopper 10 is well suited for handling food products such as sweets, crisps, chips, raw and cooked meat and breaded food products. The production of these food products often creates or requires slack in the form of coatings, crumbs, powders or particulates. Such slack may comprise a liquid and/or solids. The hopper 10 is configured to remove excess slack from product therein.

Together FIGS. 1a to 1d show the hopper 10 at different stages of a method in which slack S is removed from a mixture of product P and slack S. As shown, the average dimensions of the slack S are approximately an order of magnitude smaller (i.e. at least 10 times smaller) than the average dimensions of the product P. However, in further examples the average dimensions of slack may be at least 5 times smaller, at least 10 times smaller, at least 20 times smaller or 50 times smaller than the average dimensions of the product. In an example the product P is a sweet or candy, the slack S is excess sugar used to coat the product.

Figure 1A:
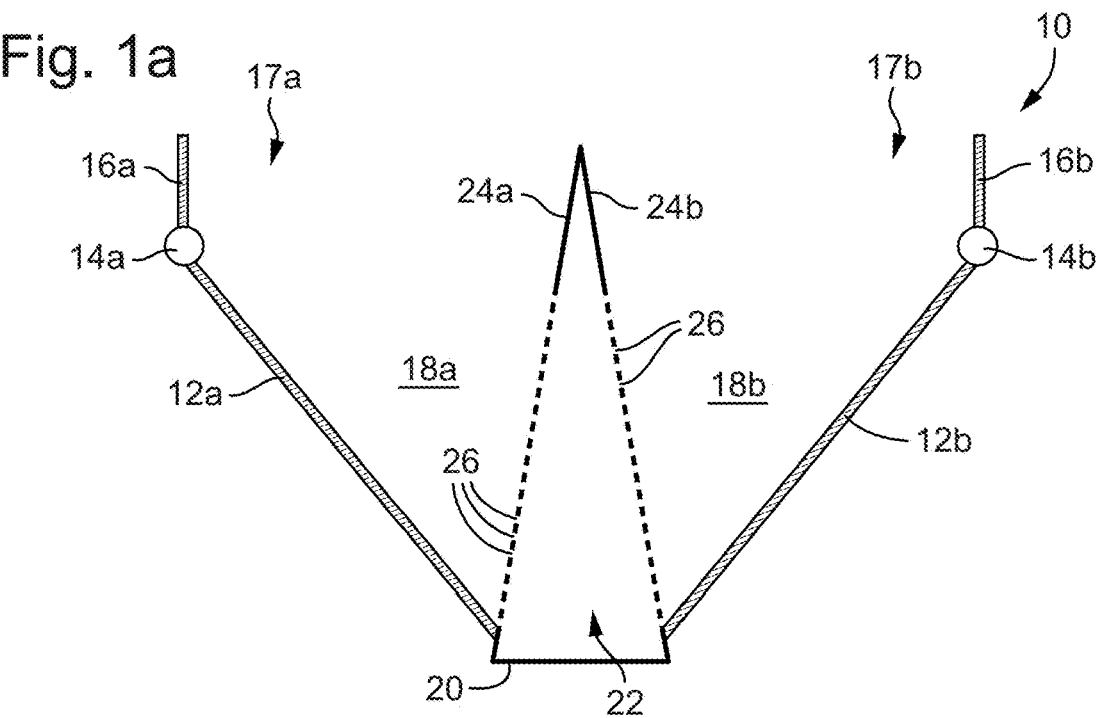
FIGS. 1a to 1d show schematic cross sections of a hopper in accordance with the invention, the figures show the hopper at different stages of a method of removing slack from a mixture of product and slack in accordance with the invention.

As is most easily seen from FIG. 1a, the hopper 10 is symmetric and comprises two opposing gates—a first gate 12a and a second gate 12b—on either side of the slack removal body 20. The gates 12a, 12b are movable, each being configured to move between a respective closed position (shown in FIGS. 1a, 1b and 1c) and a respective open position (shown in FIG. 1d). Specifically, each gate 12a, 12b is configured to rotate about a respective hinge 14a, 14b which connects the gate 12a, 12b to a respective static wall 16a, 16b of the hopper 10.

Two product receiving volume—a first product receiving volume 18a and a second product receiving volume 18b—are defined between the slack removal body 20 and the respective gates 12a, 12b when said gates 12a, 12b is in their closed positions. As such, the product receiving volumes 18a, 18b are positioned on opposite sides of the slack removal body 20. Product P may be introduced or dispensed into these hollow product receiving volumes 18a, 18b through upwards facing openings 17a, 17b at the top of the hopper 10.

The slack removal body 20 is triangular in cross section (although this is not essential) and comprises an internal chamber 22 configured to receive slack S from the product receiving volumes 18a, 18b of the hopper 10. The internal chamber 22 is an enclosed cavity within the slack removal body 20.

The internal chamber 22 of the slack removal body 20 is separated from each product receiving volume 18a, 18b are separated by respective filter wall 24a, 24b. In other words, the first product receiving volume 18a is separated from the internal chamber 22 by a first filter wall 24a, whereas the second product receiving volume 18b is separated from the internal chamber 22 by a second filter wall 24b.

As will be seen from the figures each filter wall 24a, 24b comprises a plurality of apertures 26 extending therethrough (i.e. the apertures 26 are holes that extend through the filter wall). As such, at least a portion of the filter walls 24a, 24b may be formed as a mesh, grill, grate, filter, gauze, sieve or net. The apertures 26 are sized such that slack S can pass through the apertures 26, but product P cannot. Thus, at least one dimension of each aperture is smaller than a minimum dimension of the product with which the hopper 10 is intended for use such that product P cannot pass through the apertures 26. Whereas, each dimension of the apertures 26 is greater than the maximum dimension of the slack S for which the hopper 10 is intended for use with. In contrast the gates 12a, 12b, static walls 16a, 16b and the remaining walls of the slack removal body 20 are continuous (i.e. without apertures) such that neither product P nor slack S may pass therethrough.

The operation of the hopper 20 shown in FIGS. 1a to 1d will now be explained with reference to the figures which show sequential steps of a method in accordance with the invention for removing slack S from a mixture of product P and slack S.

FIG. 1a shows the hopper 10 in an arrangement where both the first and second gates 12a, 12b are in their closed positions and the hopper is empty of both slack S and product P. As discussed above, in this arrangement a respective product receiving volume 18a, 18b is defined between each gate 12a, 12b and the slack removal body 20. The free ends of the first and second gates 12a, 12b—i.e. the ends of the first and second gates 12—contact the respective filter walls 24a, 24b of the slack removal body 20. Specifically, each gate 12a, 12b is angled and slopes towards the slack removal body 20 from their hinge 14a, 14b to their free ends. In the hopper 10 shown in FIGS. 1a-1d the angle between each gate 12a, 12b and the vertical axis is approximately 40 degrees when the gates 12a, 12b are in their respective closed positions. However, in further preferred examples during use the angle between each gate 12a, 12b in its closed position and the vertical axis is preferably less than 45 degrees, more preferably less than 40 degrees, more preferably still less than 30 degrees.

Figure 1B:
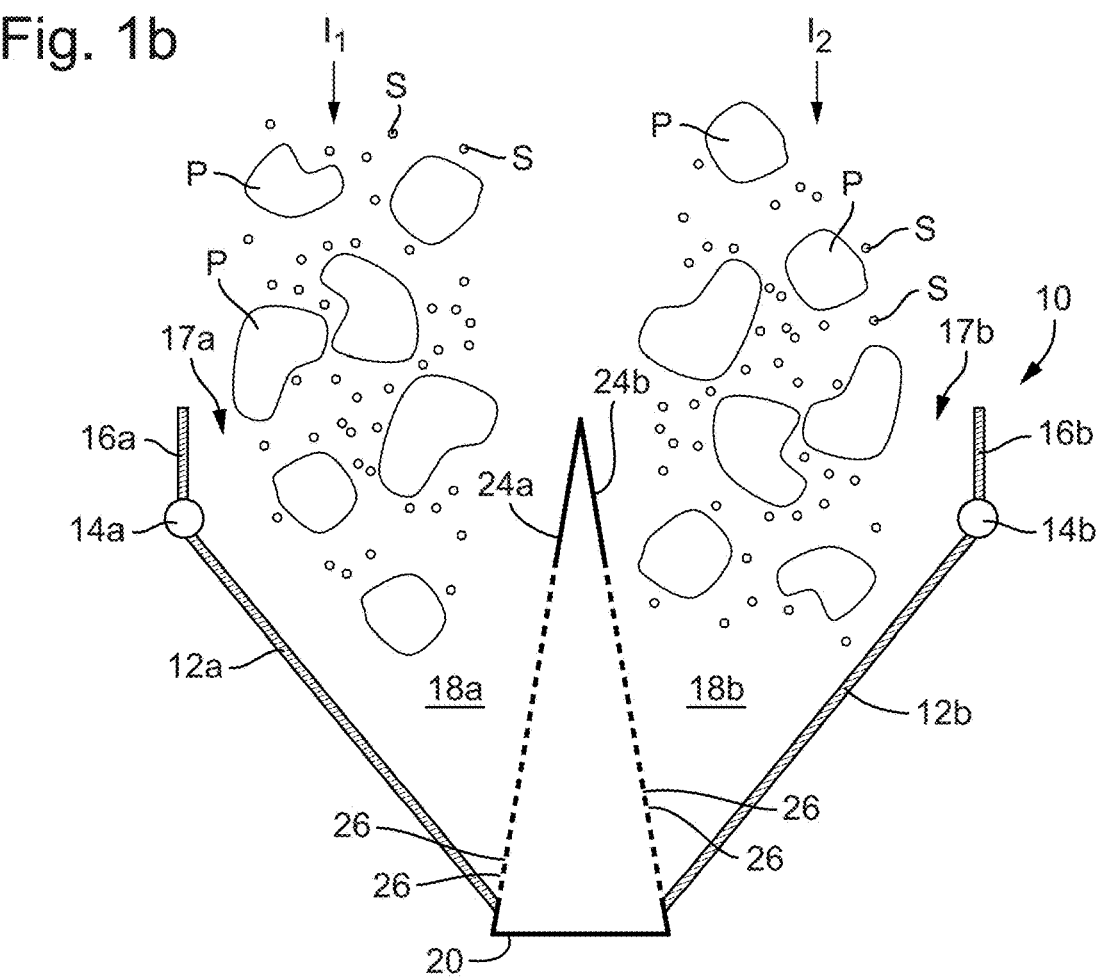

With the hopper 10 in this initial closed arrangement, product (e.g. product P within a mixture of product P and slack S) is introduced into each product receiving volume 18a, 18b as shown in FIG. 1b. A mixture of product P and slack S is introduced into the first product receiving volume 18a as shown by arrow $I_1$. Similarly a mixture of product P and slack S is introduced into the second product receiving volume 18b as shown by arrow $I_2$. As shown, the product P and slack S are dispensed to the hopper 10 under gravity, although this is not essential. The product P and slack S may be dispensed from a computer controller weigher or other feed device (not shown).

In FIG. 1b it will be seen that a mixture of product P and slack S is dispensed into the product receiving volumes 18a, 18b. In other words, in the example shown in FIG. 1b slack S has been generated upstream of the hopper 10. However, alternatively or additionally, slack S may alternatively or additionally be generated as the product P enters the hopper 10. For instance where product P falls a distance from a feed device into the hopper 10 and strikes the gate(s) 12a, 12b and slack removal body 20 the product may be damaged and/or break apart. Thus it will be understood that the slack S within the mixture of product P and slack S provided into product receiving volumes 18a, 18b may be introduced or dispensed into the volumes or generated within the volumes.

Figure 1C:
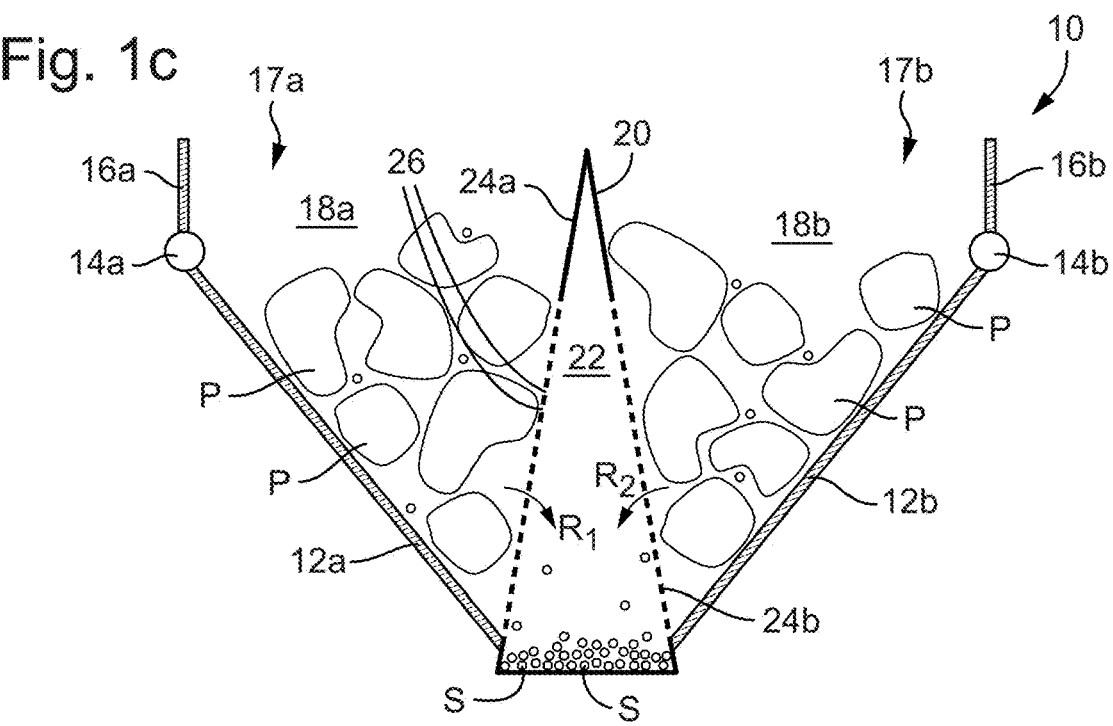

The product P provided into the product receiving volumes 18a, 18b is retained within the volumes 18a, 18b whilst the respective gate 12a, 12b remains closed. This arrangement in which the product P is held in the product receiving volumes 18a, 18b of the hopper is shown in FIG. 1c.

In contrast, slack S within the mixture of product P and slack S is able to exit the product receiving volumes 18a, 18b and enter the internal chamber 22 of the slack removal body 20 via the apertures 26 in the respective filter walls 24a, 24b. The movement of slack S from the first product receiving volume 18a through apertures 26 in the first filter wall 24a is shown by arrow $R_1$ in FIG. 1c. Whereas, the movement of slack S from the second product receiving volume 18b through apertures 26 in the second filter wall 24b is shown by arrow $R_1$ in FIG. 1c.

This movement of slack S occurs under gravity. Slack S in each product receiving volume 18a, 18b will tend to flow through the mixture of product P and slack S and across the internal surface of the respective sloped gate 12a, 12b towards the respective filter wall 24a, 24b. However, in further examples suction force may be applied to pull slack from the product receiving volumes 18a, 18b into the internal chamber 22 by connecting a vacuum pump to an opening (not shown) in the internal chamber 22.

Figure 1D:
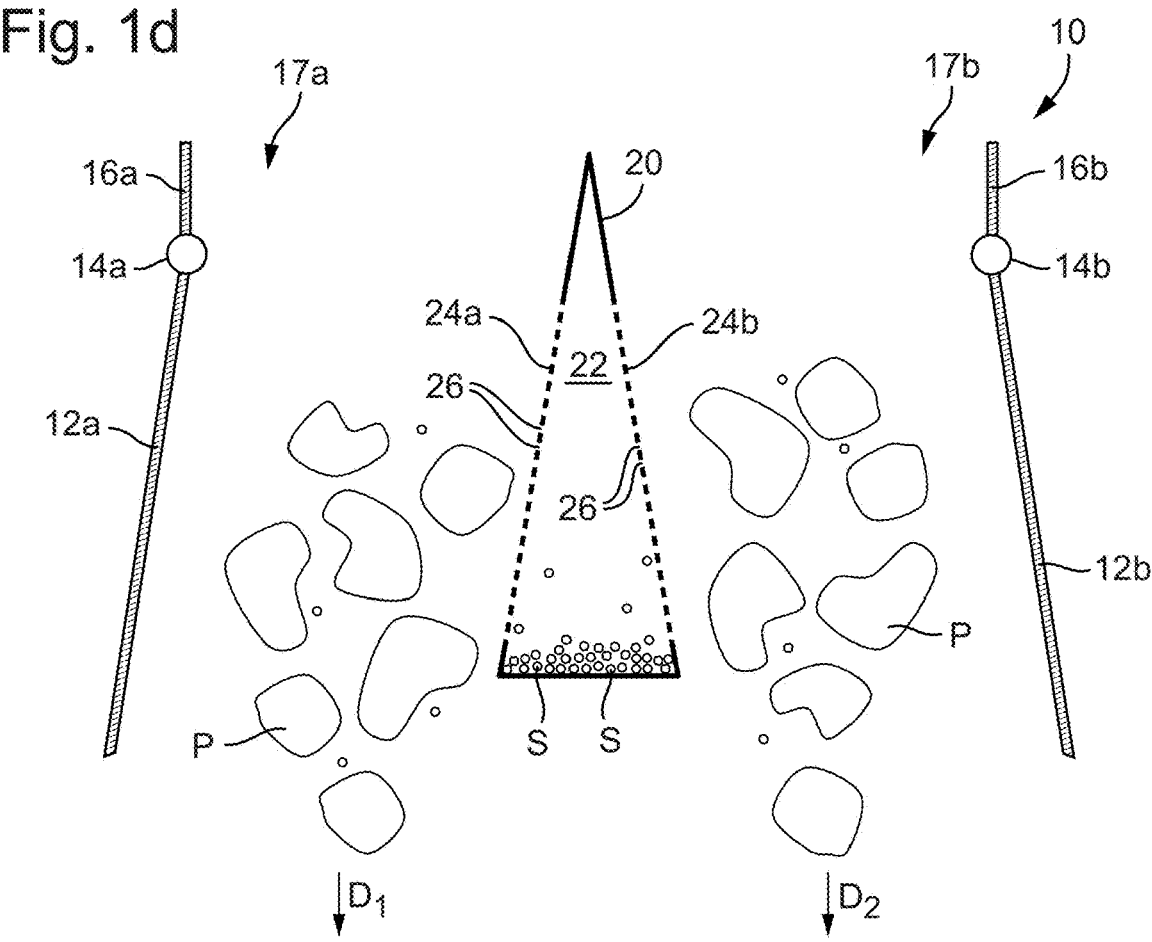

It will be appreciated that the method may not involve removing all slack S from the mixture in the product receiving volumes 18a, 18b. Instead, in practice small amounts of slack S will typically remain in the product receiving volumes 18a, 18b with the product P, as is shown in FIG. 1c. Moreover, the proportion of slack S removed from the mixture of product P and slack S may be controlled by (for instance) varying the so-called "dwell time" of product P within the hopper 10—i.e. the time between providing (i.e. introducing) product or a mixture of product and slack into a product receiving volume 18a, 18b (as shown in FIG. 1b) and opening the respective gate 12a, 12b of the hopper 10 (as shown in FIG. 1d). Equally, the proportion of slack S that can be separated from a mixture will be affected by variations in the construction of each filter wall 24a, 24b and its apertures 26, and changes in the sizes and relative angles of the slack removing chamber 20 and gates 12a, 12b. FIG. 1c shows an arrangement in which the majority of slack S has been removed from the product P. Indeed, in preferred examples over 95% of the slack S in the mixture of product P and slack S (e.g. as measured by weight and/or volume) is removed. However, in other examples it may be sufficient to remove at least 15%, at least 25%, at least 50% or at least 75% of the slack by weight and/or by volume from the product P.

In preferred embodiments of the method there may be a predetermined delay between providing a mixture of product P and slack S into a product receiving volume 18a, 18b and subsequently moving the respective gate 12a, 12b into its open position to dispense the remaining product P. This time is commonly in the range of 200 ms to 100 ms and more preferably in the range 400 to 600 ms.

Alternatively, the weight of the hopper 10 and/or the contents of one or more of the product receiving volumes 18a, 18b may be monitored to determine when the hopper 10 has reached a steady state and/or when sufficient slack S has been removed from the mixture of product P and slack S. The hopper and/or the respective product receiving volume(s) 18a, 18b may only be opened when such a determination is made. This process may include obtaining a time series of weight measurements of the contents of the hopper, the first product receiving volume 18a and/or the second product receiving volume 18b. The time series may be continuous or periodic. The weight measurement may then be analysed by a controller to determine when the weight of the contents has stabilised. For instance, stabilisation may be deemed to occur if the change in weight between two or more consecutive measurements is below a predetermined weight value.

Once slack S has been removed from the mixture of product P and slack S each gate 12a, 12b of the hopper 10 is opened to discharge or dispense the remaining product P together with lower levels of slack. For instance, the hopper 10 may dispense the product P to a packaging machine, further hoppers, or further processing machinery (not shown).

The hopper 10 with its gates 12a, 12b in their open positions is shown in FIG. 1d. Product P from the first product receiving volume 18a exits the hopper 10 along a first path shown by arrow $D_1$. Product P from the second product receiving volume 18b exits the hopper 10 along a second path shown by arrow $D_2$. This movement occurs under gravity. The first and second paths taken by product P from the opposing product receiving volumes 18a, 18b are substantially parallel, although this is not essential.

Subsequently, the first and second gates 12a, 12b can be closed, returning the hopper to the arrangement shown in FIG. 1a so that the method may be repeated with further batches of product P.

The slack S separated from the mixtures of product P and slack S and retained within the internal chamber 22 of the slack removal body 20 can be collected (i.e. removed) periodically or continuously. The collection may be manual or automatic (e.g. using a vacuum pump connected to the internal chamber 22). As discussed above, in some cases the slack S may be reused or reincorporated into the product process upstream of the hopper 10.

Throughout the process discussed above the slack removal body 20 remains stationary. As seen from the drawings, the gates 12a, 12b are opened and closed whilst the slack removal body remains in substantially the same position. The slack removal body is unpowered and need not be connected to any motor or other actuator configured to provide movement. Nevertheless, preferably the slack removal body 20 may be detachably fixed to the hopper, such that it can be detached (i.e. removed) for emptying, cleaning or maintenance. Even where the slack removal body is detachably fixed to the hopper and remains substantially stationary during use, vibrations may be transmitted to the slack removal body 20 and slack S therein as the gates 12a, 12b of the hopper 10 are opened and closed.

In the method discussed above with reference to FIGS. 1a to 1d the product receiving volumes 16a and 16b of the hopper 10 are filled and discharged simultaneously. The opposed sides of the hopper 10 are operated synchronously, the first and second gates 12a, 12b being opened and closed together. However, this is not essential.

Figure 2A:
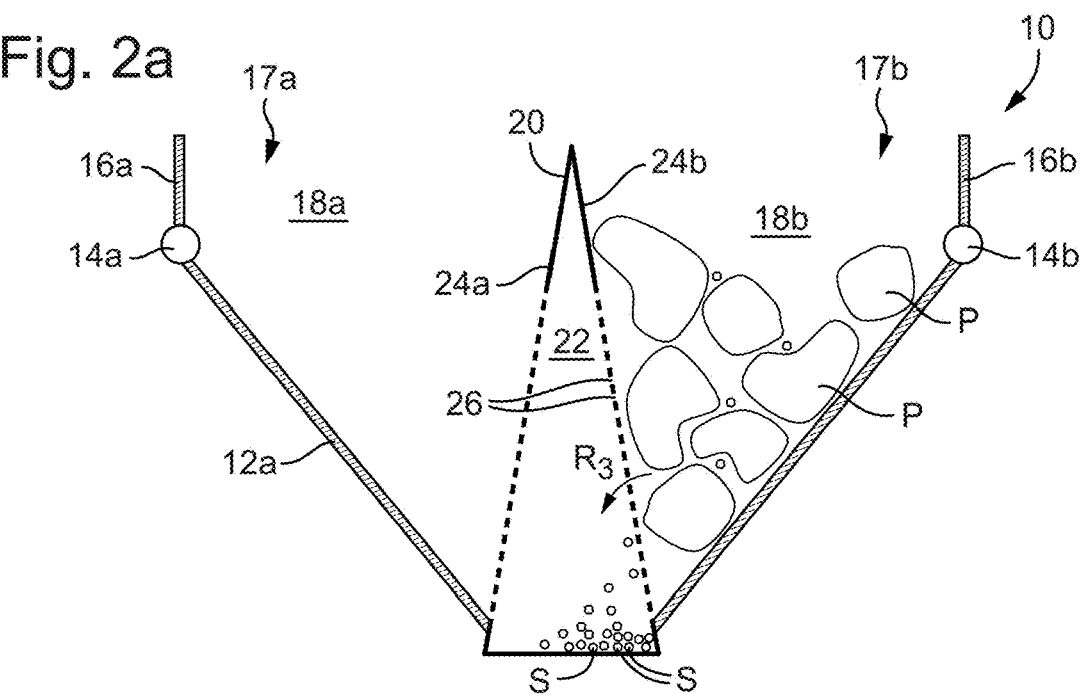
FIGS. 2a to 2c show schematic cross sections of the hopper in FIGS. 1a to 1d performing a further method of removing slack from a mixture of product and slack in accordance with the invention.
Figure 2B:
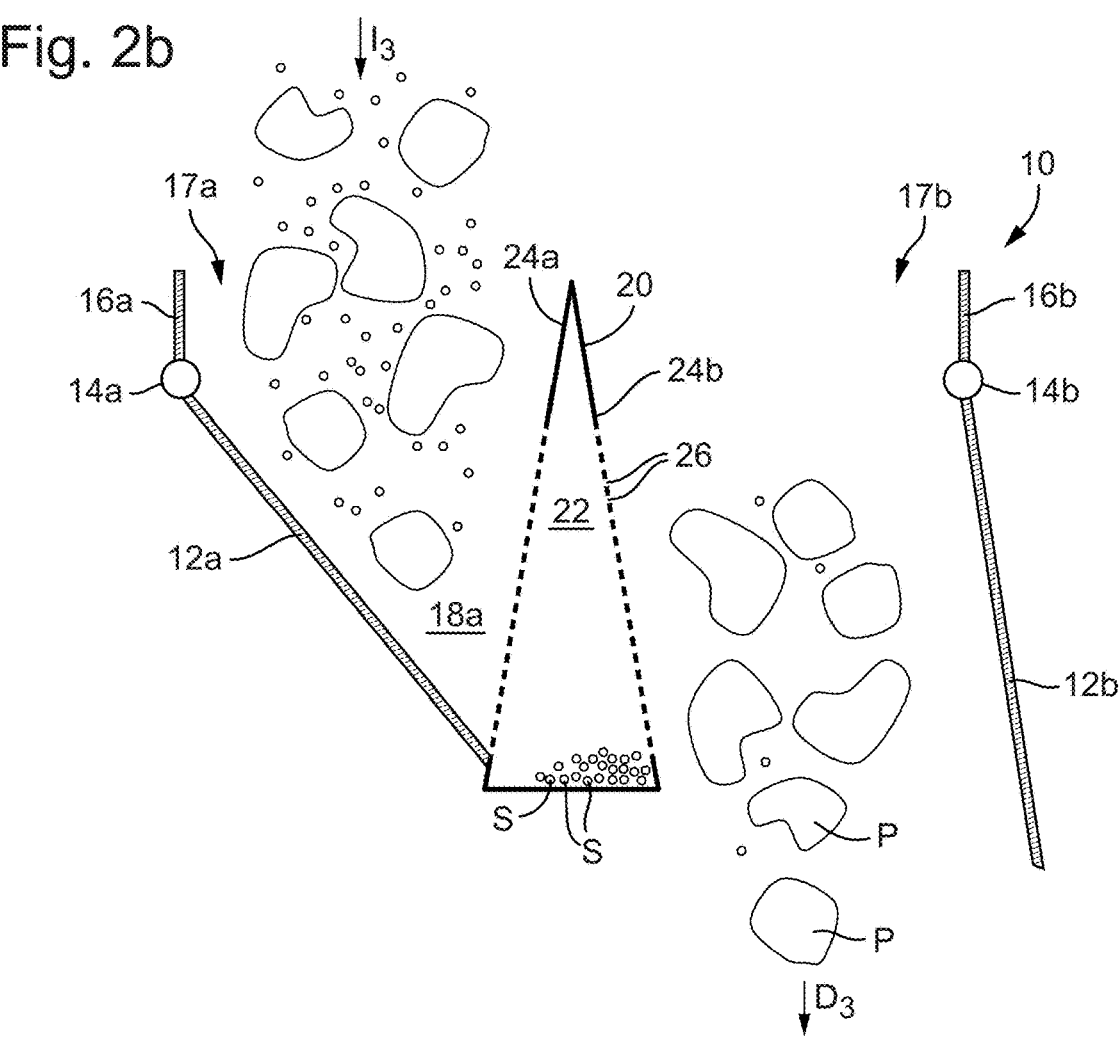
Figure 2C:
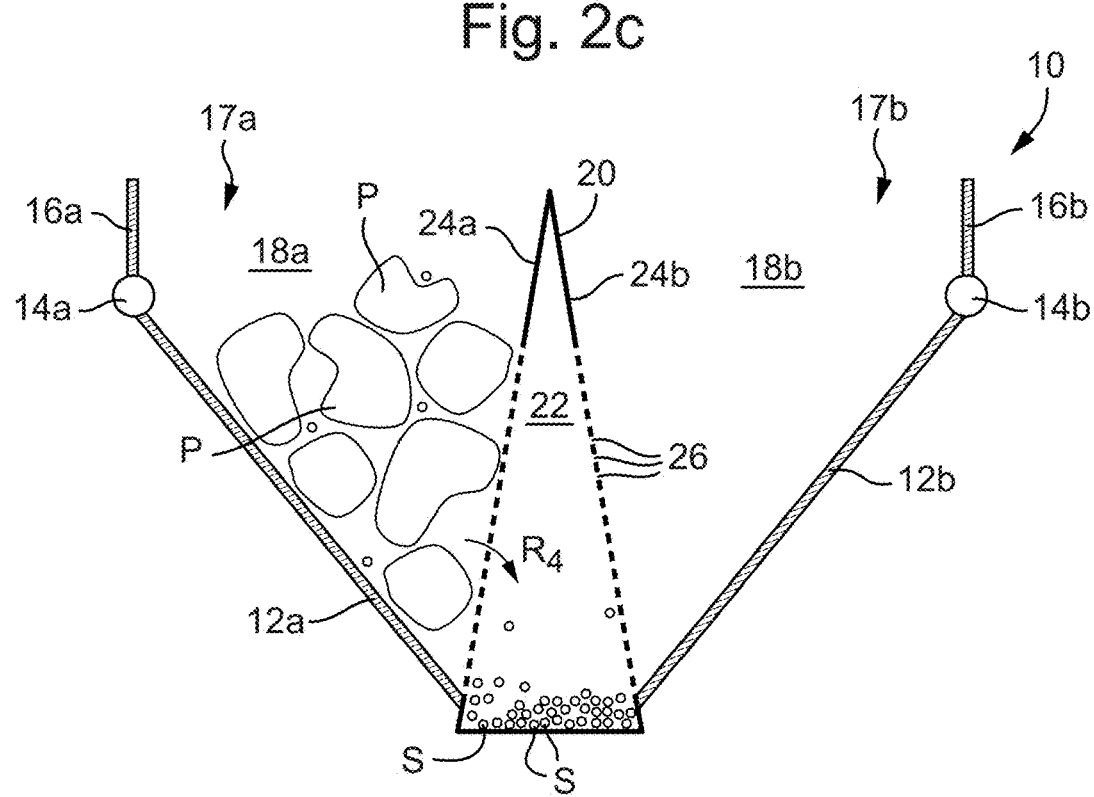

FIGS. 2a to 2c exhibit steps of a further method performed using the hopper 10 previously discussed with reference to FIGS. 1a to 1d in which the opposed sides of the hopper 10 are operated asynchronously (i.e. in a staggered manner).

FIG. 2a shows an arrangement in which both the first and second gates 12a, 12b are in their closed positions. However, only the second product receiving volume 18b is provided with a mixture of product P and slack S. As discussed above, in this arrangement slack tends to be separated from the mixture in the second product receiving volume 18b, pass through the second filter wall 24b and enter the internal chamber 22 of the slack removing body 20. This movement of slack is shown by arrow $R_3$.

Thereafter, in a further step shown in FIG. 2b, simultaneously: the second gate 12b is moved to its open position such that the product within the second product receiving volume 18b is discharged along the second path discussed above (as shown by arrow $D_3$); and a mixture of product P and slack S is introduced into the first product receiving volume 18a.

Subsequently, the second gate 12c can be closed whilst slack S is filtered out of the mixture in the first product receiving volume 18a. This arrangement is shown in FIG. 2c. Arrow $R_4$ shows how slack S from the first product receiving volume 18a enters the internal chamber 22 through the apertures 26 in the first filter wall 24a.

Thus an arrangement of the hopper 10 is reached that is mirrored relative to the initial arrangement in FIG. 2a. In FIG. 2a the first product receiving volume 18a is empty whilst the second product receiving volume 18b contains a mixture of product P and slack, whereas the in FIG. 2c the first product receiving volume 18a is filled with the mixture whilst the second product receiving volume 18b is empty.

Subsequently, the product P in the first product receiving volume 18a can be dispensed by opening the first gate 12a whilst further mixture is introduced into the second product receiving volume 18b (a mirror or reflection of the situation shown in FIG. 2b). After closing the first gate 12a the hopper 10 will be returned to the arrangement of FIG. 2a and the method may repeat.

As such, it is understood that the first and second gates 12a, 12b need not be operated together and instead the different product receiving volumes 18a and 18b may be alternately filled and emptied. This asynchronous process offers high processing speeds. The delay required as slack is separated from a mixture of product P and slack S within the product receiving regions 18a, 18b is ameliorated operating the opposed sides of the hopper 10 independently.

In further examples the hopper 10 may be controlled to change between the synchronous and asynchronous processes discussed above—e.g. based on the weight of product in the product receiving regions 18a, 18b.

Figure 3:
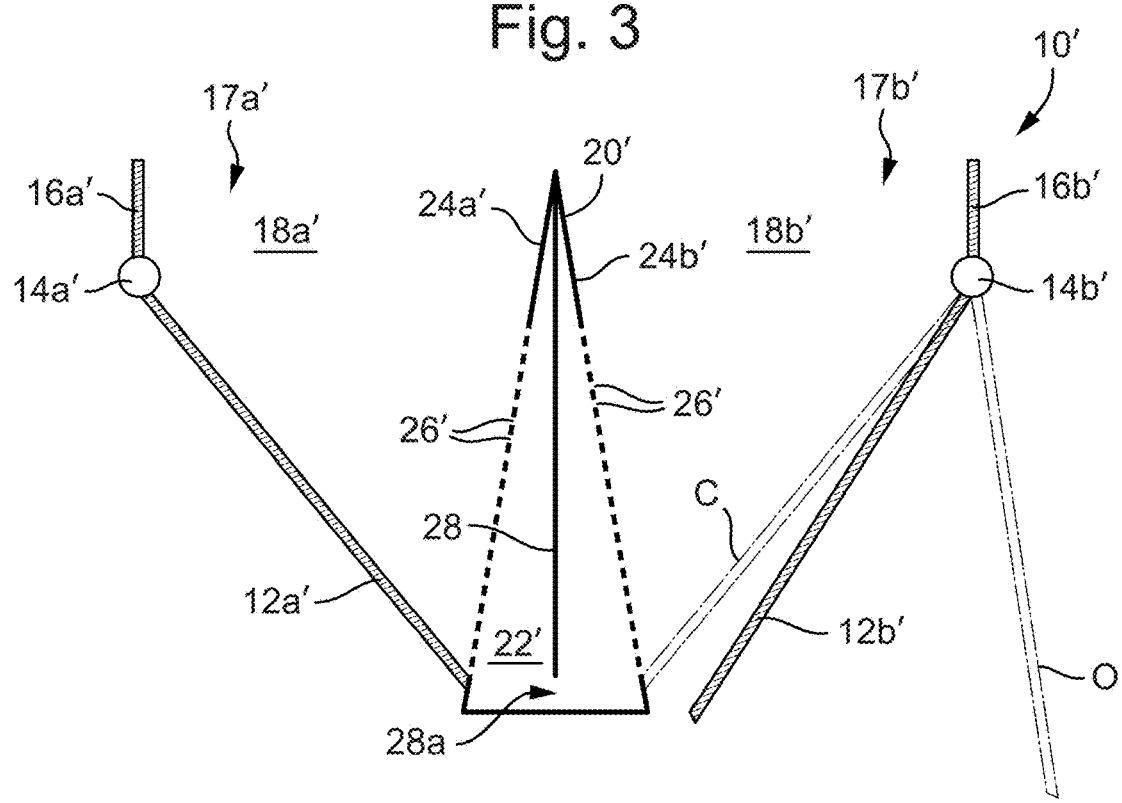
FIG. 3 shows a schematic cross section of a further hopper in accordance with the invention.

A modified version of the hopper 10 shown in FIGS. 1a-1d and 2a-2c will now be discussed with reference to FIG. 3. FIG. 3 shows a hopper 10' that shares all features of the hopper 10 of FIGS. 1a-1d and 2a-2c. Corresponding features are indicated by reference numerals with prime notation.

In addition to the features of the original hopper 10, the hopper 10' in FIG. 3 comprises an internal baffle 28 positioned within the internal chamber 22' of the slack removal body 20'. The internal baffle 28 is positioned between and separates the first and second filter walls 24a', 24b' and is configured to prevent the passage of slack therethrough. Thus, the internal baffle 28 prevents, or acts to prevent, slack entering the internal chamber 22' from the first product receiving volume 18a' through the first filter wall 24a' from immediately leaving the slack removal body 20' through the apertures in the opposing second filter wall 24b' (and vice versa). This prevents unintended release of slack back into the product pathway and surrounding machinery.

As shown, the internal baffle 28 extends along the centreline of the slack removal body 20' (although this is not essential). In addition gap 28a exists between the internal baffle 28 and a base surface of the internal chamber 20' such that slack at the base of the internal chamber 20' may mix. However, again this feature is not essential. In some embodiments the internal baffle may extend the entire height of the slack removal body, dividing its interior into two separate internal chambers for independent collection of slack.

More generally, whilst hoppers with single internal chambers (as shown in the examples of FIGS. 1a-1d to 3) above are simple to empty and/or clean they are not essential. Hoppers may comprise two or more internal chambers wherein the first filter wall separates the first product receiving volume from a first internal chamber and the second filter wall separates the second product receiving volume from a separate, second internal chamber. As such, the separate internal volumes will collect slack from the separate product receiving volumes.

In addition, FIG. 3 shows an arrangement of the hopper 10' in which the second gate 12b' is in an intermediate position between its open position O and closed position C (shown by dashed versions of the gate). The intermediate position is closer to the closed position C than the open position), approximately 90 to 95% of the distance from the open position O to the closed position C.

In some methods of separating slack from a product mixture, the closing of the first and/or second gates 12a', 12b' of a hopper 10' comprises two discrete (i.e. separate) closing steps: a first closing step in which the gate(s) 12a', 12b' are moved from their open position(s) to an intermediate position; and a second closing step in which the gate(s) 12a', 12b' are moved from the intermediate position(s) to their closed position(s). Between the two closing steps the gate remains substantially stationary, such that the movement of gate is paused. This two-step process is highly dynamic and can transfer significant vibration to the slack removal body 20' and its contents. This two-step gate closing process may be used in the methods discussed above with reference to FIGS. 1a-1d and 2a-2c.

Figure 4A:
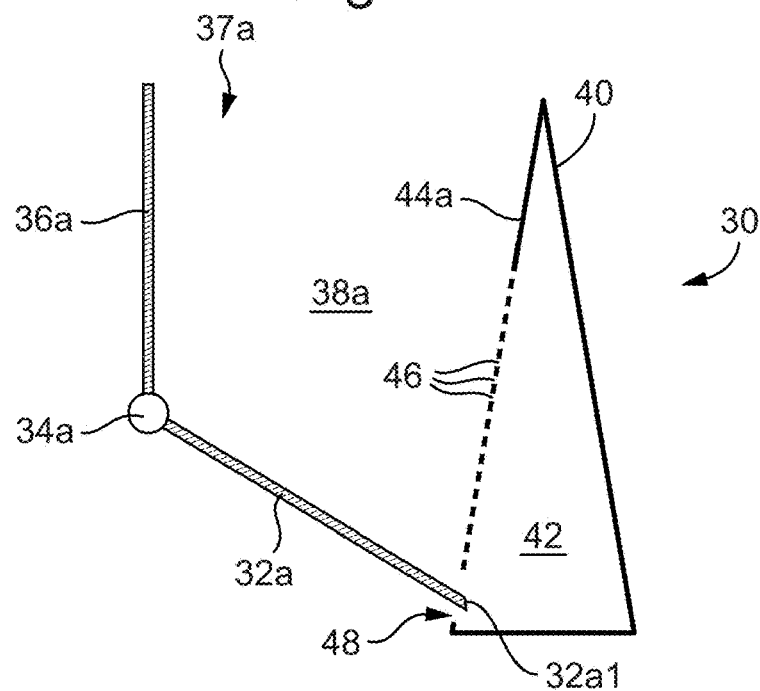
FIGS. 4a and 4b shows a schematic cross section of a further hopper in accordance with the invention.
Figure 4B:
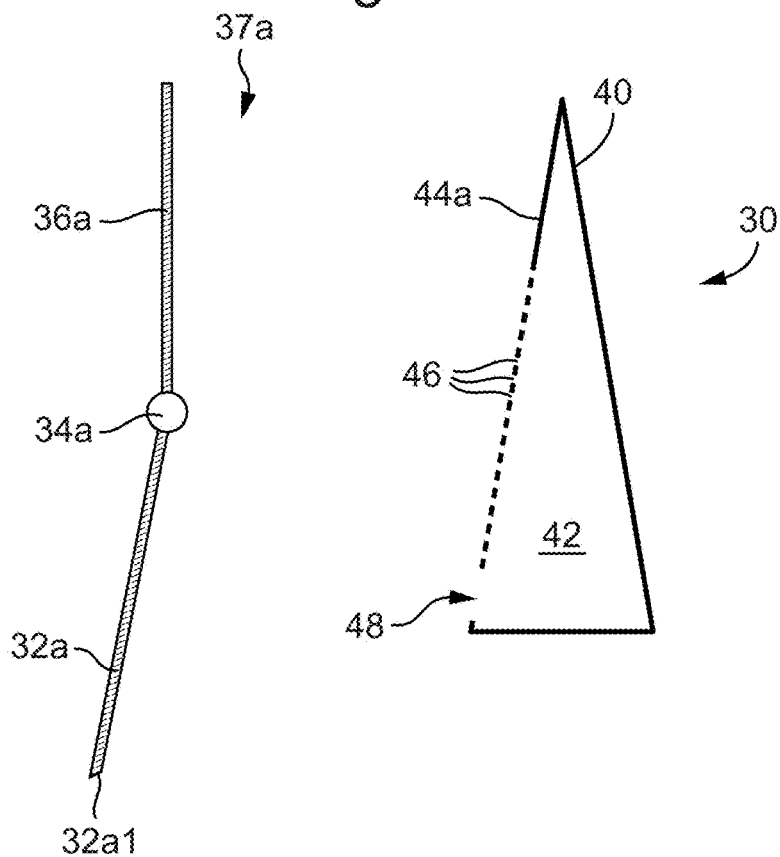

The hopper 10 shown in FIGS. 1a-1d and 2a-2c is "double-sided" in that it comprises a pair of opposed gates 12a, 12b and a pair of opposed product receiving volumes 18a, 18b positioned on either side of a slack removal body 20. In contrast, FIGS. 4a and 4b show a schematic cross section of a hopper 30 which is also suited for the removal of slack from a mixture of product and slack, but which is "single-sided" and comprises a single gate 32a and a single product receiving volume 38a. Reference signs of features of the hopper 30 in FIGS. 4a and 4b that correspond to equivalent features of the hopper 10 shown in FIGS. 1a-1d and 2a-2c have been incremented by 20 between the figures.

As will be seen, the single-sided hopper 30 of FIGS. 4a and 4b comprise a gate 32a which is configured to rotate about a hinge 34a coupled to a static wall 36a. FIG. 4a shows the hopper 30 with its gate 32a in its closed position in which product may be retained in a product receiving volume 38a of the hopper 30. FIG. 4b shows the hopper 30 with its gate 32a in an open position in which product may be discharged from the hopper 30. It will be understood that the gate 32a comprises a hinged end that is coupled to the hinge 34a and an opposite, free end 32a1 at the distal part of the gate 32a furthest from the hinge 32a.

The hopper 30 comprises a slack removal body 40 which is configured to separate and store slack that has been introduced into or generated within the product receiving volume 38a of the hopper 30. Product or a mixture of product and slack may be introduced to the product receiving volume via the upward facing opening 37a. The slack removal body 40 is hollow and comprises an internal chamber 42 configured to receive slack, and a filter wall 44a that is designed to allow slack to pass therethrough but to prevent the passage of product. The filter wall 44a extends between the internal chamber 42 of the slack removal body 40 and the product receiving volume 38a.

The filter wall 44a comprises a plurality of apertures 46 that are dimensioned to allow slack to enter the internal chamber 42. As such, a portion of the filter wall 44a is formed as a mesh, grill, grate, filter, gauze, sieve or net.

In addition, the filter wall 44a comprises a slot 48 that is configured to receive the free end 32a1 of the gate 32a of the hopper 30 when the gate 32a is in its closed position. This slot 48 extends through the filter wall 44a. The slot 48 has a width that is larger than the maximum dimension of slack the hopper 30 is intended for use with and a length that is preferably at least as large as the width of the free end 32a1 of the gate 32a. As will be seen, the slot 48 is located in a position in the filter wall 44a at which the gate 32a and the filter wall 44a would intersect if either the slot 48 was not present.

As shown in FIG. 4a, in its closed position the gate 32a slopes (i.e. is angled) towards the filter wall 44a such that its free end 32a1 enters the slot 48. Thus, when the gate 32a is in its closed position, slack in the product receiving volume 38a which is in contact with the internal surface of the gate 32a will tend to flow down the gate 32a under gravity and directly into the internal chamber 42 of the slack receiving body 40. As such, slack may be particularly easily separated from a mixture of product and slack in the product receiving volume 38a. The gaps defined between the gate 32a and the boundaries of the slot 48 are smaller than the minimum dimension of the product that is to be used with the hopper 30. As such, product can still be securely retained in the product receiving volume 38a of the hopper 30 when the gate 32a is closed.

Thus it will be appreciated that the slot 48 shown in FIG. 3 is a specific example of an aperture provided through a filter wall of a slack removal body discussed herein. These slots can be incorporated into so-called "double-sided" hoppers shown in FIGS. 1a-1d and 2a-2c. In further examples filter walls may be provided with only a slot, such that the slot is the single aperture through the filter walls by which slack may pass into the internal chamber of a slack removal body.

The hopper 30 shown in FIGS. 4a and 4b may be operated to remove slack from a mixture of product and slack using a similar method to the examples discussed above with reference to FIGS. 1a-1d and 2a-2c.

When the hopper 30 has its gate 32a in a closed position (as shown in FIG. 4a) a mixture of product and slack may be provided or introduced into the slack receiving volume 38a. Subsequently, product will be retained in the product receiving volume 38a, whereas slack will tend to exit the product receiving volume 38a and enter the internal chamber 42 of the slack removal body 40. In doing so, the slack will pass through the apertures 46 and slot 48 which extend through the filter wall 44a of the slack removal body 40. Thereafter the product and any remaining slack may be discharged (i.e. dispensed) from the hopper 30 by moving the gate 32a to its open position. This creates a path for product to exit the hopper under gravity. Finally, the gate 32a may be moved to its closed position to close the path for product to exit the hopper 30 and to allow the process to repeat. Again throughout this method the slack removal body 40 will remain substantially stationary. Indeed, preferably the slack removal body is not actuated and is detachably fixed relative to the static components of the hopper 30 (e.g. the static wall 36a). This method and the hopper 30 shown in FIGS. 4a and 4b may comprise any of the additional steps and features discussed above with reference to FIGS. 1a-1d and 2a-2c.

Although not shown in the schematic diagrams of FIGS. 1a-1d and 2a-2c, in many combinations of product and slack the slack tends to fall quicker under gravity than the product. As such, when a mixture of product and slack is introduced into the hopper 30 of FIGS. 4a and 4b will tend to reach the gate 32a before the product and will be quickly diverted through the slot 48 and into the slack removal body 40.

A further hopper 100 suitable for removing slack from a mixture of product and slack is shown in FIGS. 5a to 5f. Once again, this hopper 100 is particularly well suited for use with food products. Moreover, the hopper 100 may be operated to remove slack through the same method steps as described above in reference to FIGS. 1a-1d, 2a-2c and 3.

Figure 5C:
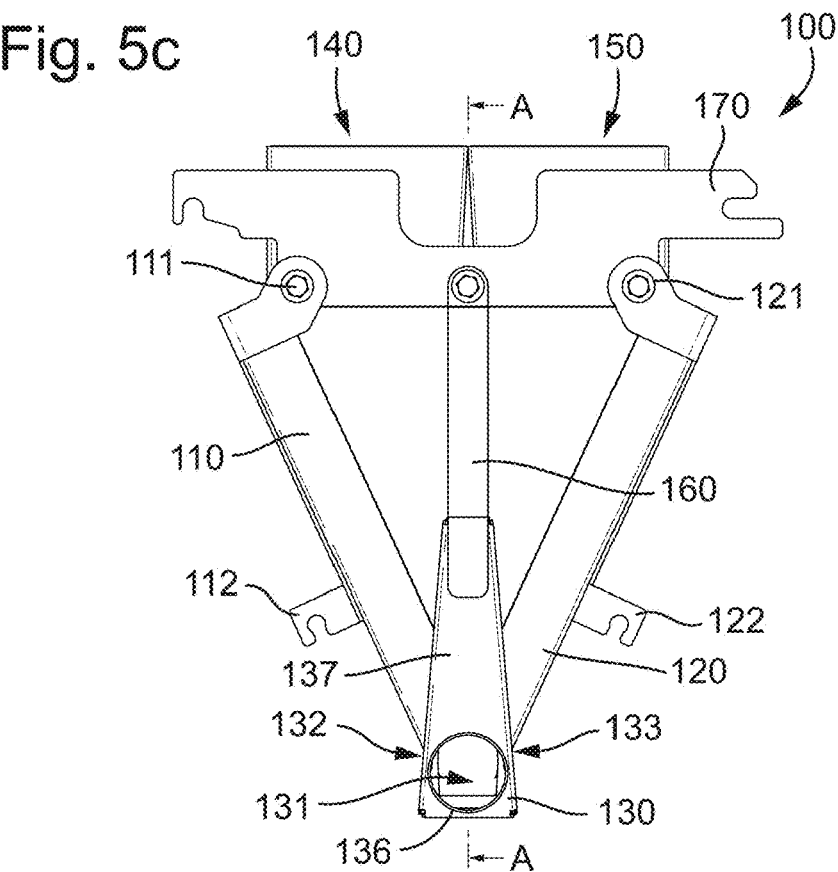
Figure 5D:
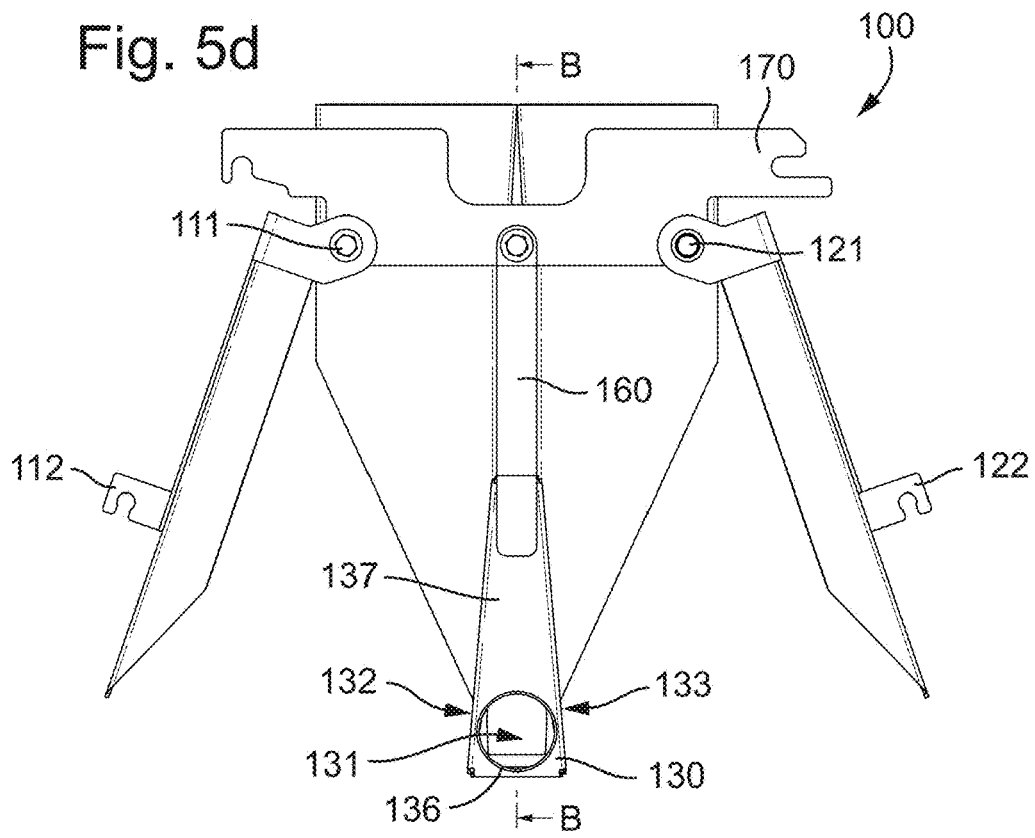

FIGS. 5a and 5b show the 100 hopper in isometric perspective, FIGS. 5c and 5d show the hopper 100 from a side view from a similar position to the cross sections in FIGS. 1a to 3, and FIGS. 5e and 5f show the hopper in cross section along the lines A-A and B-B shown in FIGS. 5c and 5d.

The hopper 100 is double sided and substantially symmetric, comprising two moveable gates—a first gate 110 and a second gate 120. The moveable gates 110, 120 are opposed with a slack removal body 130 positioned between them. The gates 110, 120 may be moved between respective closed positions and open positions. FIGS. 5*a*, 4*c* and 4*e* show the hopper 100 with both gates 110, 120 in their respective closed positions. Whilst FIGS. 5*b*, 5*d* and 5*f* show the hopper 100 with its gates 110, 120 in their respective open positions. The first and second gates 110, 120 are configured to rotate about respective first and second hinges 111, 121. Each gate 110, 120 may be actuated by (for instance) a motor such as a harmonic drive, linear servo motor or a pneumatic actuator that is connected to the respective bracket 112, 122 on the exterior surface of the gate 110, 120.

The slack removing body 130 is hollow and comprises an internal chamber 131 configured to receive and retain slack. Furthermore, the slack removal body 130 comprises two opposed filter walls 132, 133. The filter walls 132 and 133 are each configured to permit slack to pass therethrough but to prevent the passage of product. As such, each filter wall 132, 133 comprises a plurality of small circular apertures 134 arranged in a regular array. The regular pattern of apertures 134 in the second filter wall 133 can be seen in FIGS. 5*b*, 5*e* and 5*f*. As with the preceding examples the apertures 134 have dimensions that are greater than the typical dimensions of slack, but smaller than the typical dimensions of product. Suitable dimensions for the apertures 134 in the plane of the filter wall (i.e. the diameter of the circular apertures 134) is from 0.05 cm to 1 cm and preferably from 0.1 cm to 0.5 cm.

In addition, the first and second filter walls 132, 133 each comprise a slot 135, wherein the hopper 100 is configured such that the free end of the first gate 110 enters the slot 135 in the first filter wall 132 when the first gate 110 is in its closed position, and the free end of the second gate 120 enters the slot 135 in the second filter wall 133 when the second gate 120 is in its closed position. Each slot 135 is greater in width than the free end of the respective gate 110, 120 and extends continuously along the free end of the respective gate 110, 120 when said gate 110, 120 is in its closed position. As seen, each slot 135 is positioned within the respective filter wall 132, 133 at a position at which said filter wall 132, 133 and the respective gate 110, 120 would intersect if the slot 135 were not present and/or the gate 110, 120 was greater in length.

Figure 5E:
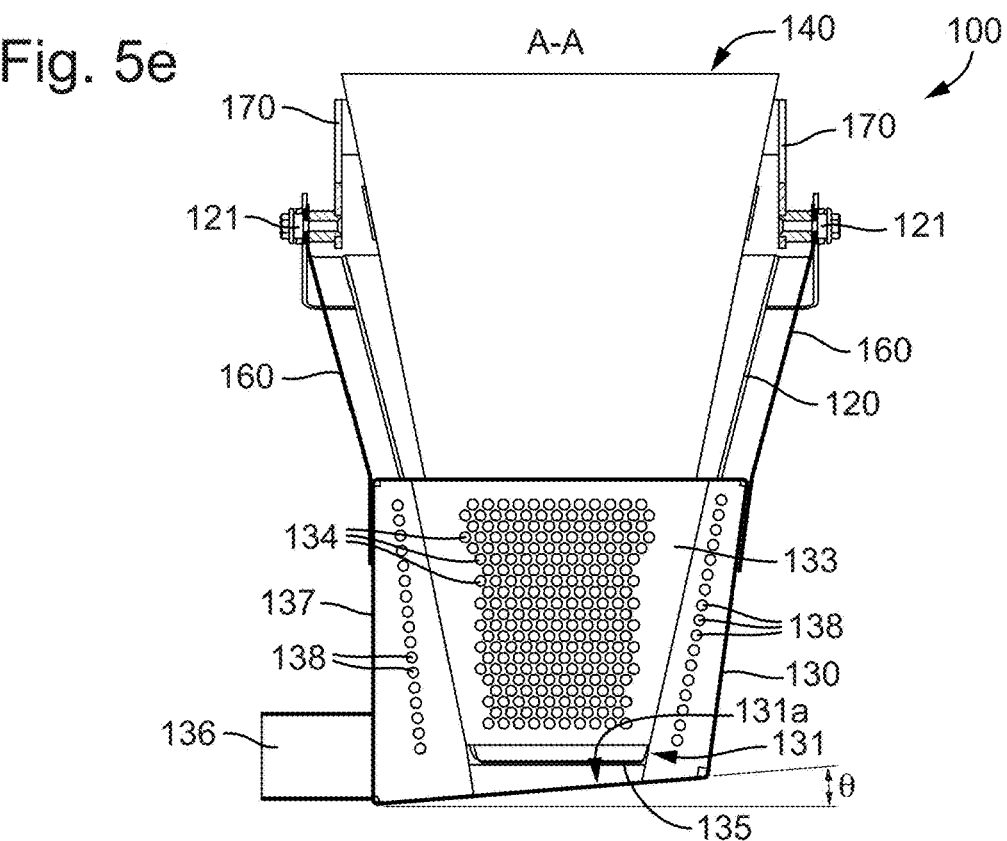
Figure 5F:
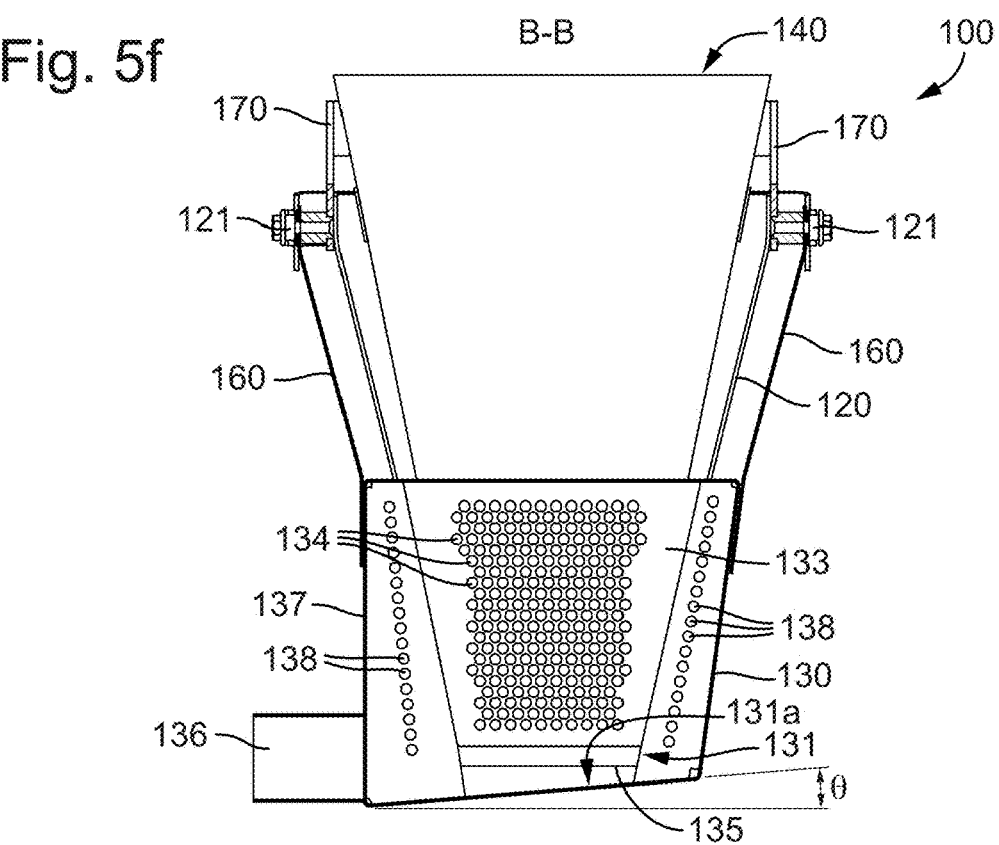

When the first gate 110 is in its closed position (as shown in FIGS. 5*a*, 5*c* and 5*e*) a first product receiving volume is defined between the gate 110 and the first filter wall 132. The hopper 100 is configured such that product provided into this volume during will be retained there whilst the first gate 110 remains closed. Similarly, when the second gate 120 is in its closed position (as shown in FIGS. 5*a*, 5*c* and 5*e*) a second product receiving volume is defined between the gate 120 and the second filter wall 133.

The hopper 100 further comprises two chutes—the first chute 140 and second chute 150—through which product, or a mixture of product and slack, may be introduced into the respective first and second product receiving volumes. The chutes 140, 150 are tubular with a rectangular cross section as seen from above. Product received into each chute 140, 150 is directed to the corresponding product receiving volume when the respective gate 110, 120 is closed. As such, the chutes 140, 150 define openings into the corresponding product receiving volumes. The chutes 140, 150 are arranged such that a mixture of product and slack is directed towards the respective filter walls 132, 133 in a substantially perpendicular manner. As such, the average direction of the product and/or slack as they enter the hopper and contact the respective filter wall 132, 133 is at an angle of greater than 45 degrees relative to the surface of the respective filter wall 132, 133. This can increase the proportion of slack that is able to pass through the apertures 134 in the respective filter wall 132, 133.

When a mixture of product and slack is provided into one or both the product receiving volumes of the hopper 100, slack will tend to travel through the apertures 134 and slots 135 of the corresponding filter wall(s) 133, 134 thereby entering the internal chamber 131 within the slack removal body 130. As such, the slack will be separated from product which remains in the product receiving volume since product cannot pass through the filter walls 133, 134. The product together with reduced levels of slack may then be discharged by opening the corresponding gate(s) 110, 120. During this slack removal process and during movement of the gates 110, 120, the slack removal body 130 remains substantially stationary.

Slack which enters the internal chamber 131 of the slack removal body 130 may be continuously or periodically removed through a circular port 136. The port 136 is an opening to the internal chamber 131 of the slack removal body 130 through which slack may be removed and is located in a side wall 137 of the slack removal body 130. For example a vacuum pump may be connected to the port 136 (e.g. via a hose or tube) to empty the hopper of slack. In further examples other openings for this purpose may be provided elsewhere in slack removal body 130.

As will be most easily seen from FIGS. 5*e* and 5*f*, the port 136 is located at a base surface 131*a* of the internal chamber 131 (i.e. at where the side wall 137 of the slack removal body meets the base surface 131*a* of the internal chamber 131). Moreover, the base surface 131*a* of the internal chamber 131 is in use angled relative to the horizontal plane, sloping towards the port 136. This angle relative to the horizontal is denoted by the symbol $\theta$ in FIGS. 5*e* and 5*f*. As such, the port 136 (i.e. opening) is located at a lowest point in the internal chamber 131 and a point towards which slack will tend to accumulate under gravity during use. Furthermore, operating a vacuum pump (not shown) connected to the port 136 will tend to pull slack down the base surface 131*a* towards the port 136.

Furthermore, the slack removal body 130 comprises a plurality of external apertures 138 which extend between its interior chamber 131 and the exterior of the hopper 100 when the gates 110, 120 are in both their open and closed positions. Indeed, as will be seen, the slack removal body 130 is wider than each of the first and second gates 110, 120. The external apertures 138 extend through external walls 138 of the slack removal body that project beyond the boundaries of the gates 110, 120. Each of these external walls 138 is continuous and coplanar with a filter walls 133,134 of the slack removal body 130. Airborne slack which surrounds the hopper 100 may be collected into the internal chamber 131 of the slack removal body 130 via the external apertures 138. This is especially successful when suction forces from a vacuum pump are applied to the internal chamber 131 via the port 136.

The slack removal body 130 is detachably connected (i.e. fixed) to the remainder of the hopper 100 by two clips 160. The clips 160 allow the slack removal body 130 to be quickly released and/or exchanged for a new body when it is necessary for cleaning and/or maintenance. The clips 160 are formed of an elastic material and are biased together to hold the slack removal body 130 in place during use. To remove and replace the slack removal body 130 the clips 160 may be manually separated. Thus the slack removal body 130 may be separated or removed from the hopper 100 by hand and without the need for additional tools (i.e. the clips 160 form a quick release mechanism). The clips are themselves coupled to the remaining components of the hopper by a screw or bolt 160a. In alternative embodiments the clips 160 may be rigid, such that they cannot be manually separated. In such examples the slack removal body 130 may be removed by unscrewing the screw or bolt 160a between each clips 130 and the slack removal body 130 (e.g. using a screwdriver). In further preferred embodiments each of the screws or bolts 160a which as shown have conventional heads may be replaced with screws, bolts or nuts comprising a lever extending from their head at an angle relative to the longitudinal axis of the screw, bolt or nut. In these embodiments, the screw, bolt or nut may be tightened and loosened manually using the lever without the need for additional tools.

Each gate 110, 120 of the hopper 100 comprises a respective major wall 113, 123 that extends in the same plane as the hinge 111, 121 about which the respective gate 110, 120 rotates. In addition, each gate 110, 120 comprises two side walls 114, 124 positioned at projecting perpendicularly from the respective major wall 113, 123 towards the slack removal body 130. When each gate 110, 120 is in its respective closed position the side walls 114, 124 contact the slack removal body 130. As such, the act of moving a gate 110, 120 into its closed position causes the side walls 114, 124 of said gate to contact the slack removal body 130, thereby transferring vibrations to the slack removal body 130 and its contents (i.e. any collected slack). These vibrations act to ensure slack continues to flow along the base surface 131a of the internal chamber 131 towards the port 136. The port 136 allows the removal or collection of slack from the slack removal body 130.

It should be noted that the free end of each gate 110, 120—i.e. the distal end of the major walls 112, 123 of the gates 110, 120 do not contact the slack removal body 130 as they instead enter into the slot 135 within the filter wall.

The hopper 100 further comprises fixing brackets 170 which allow it to be supported and/or connected to surrounding equipment. For instance, the hopper 100 may be bolted or screwed to a support structure via the fixing brackets 170 as required. The hinges 111, 121 and clips 160 couple to the fixing brackets 170 by screws and/or bolts.

The hopper 100 is preferably constructed of folded stainless steel. However, any other suitable material may be used.

Figure 6:
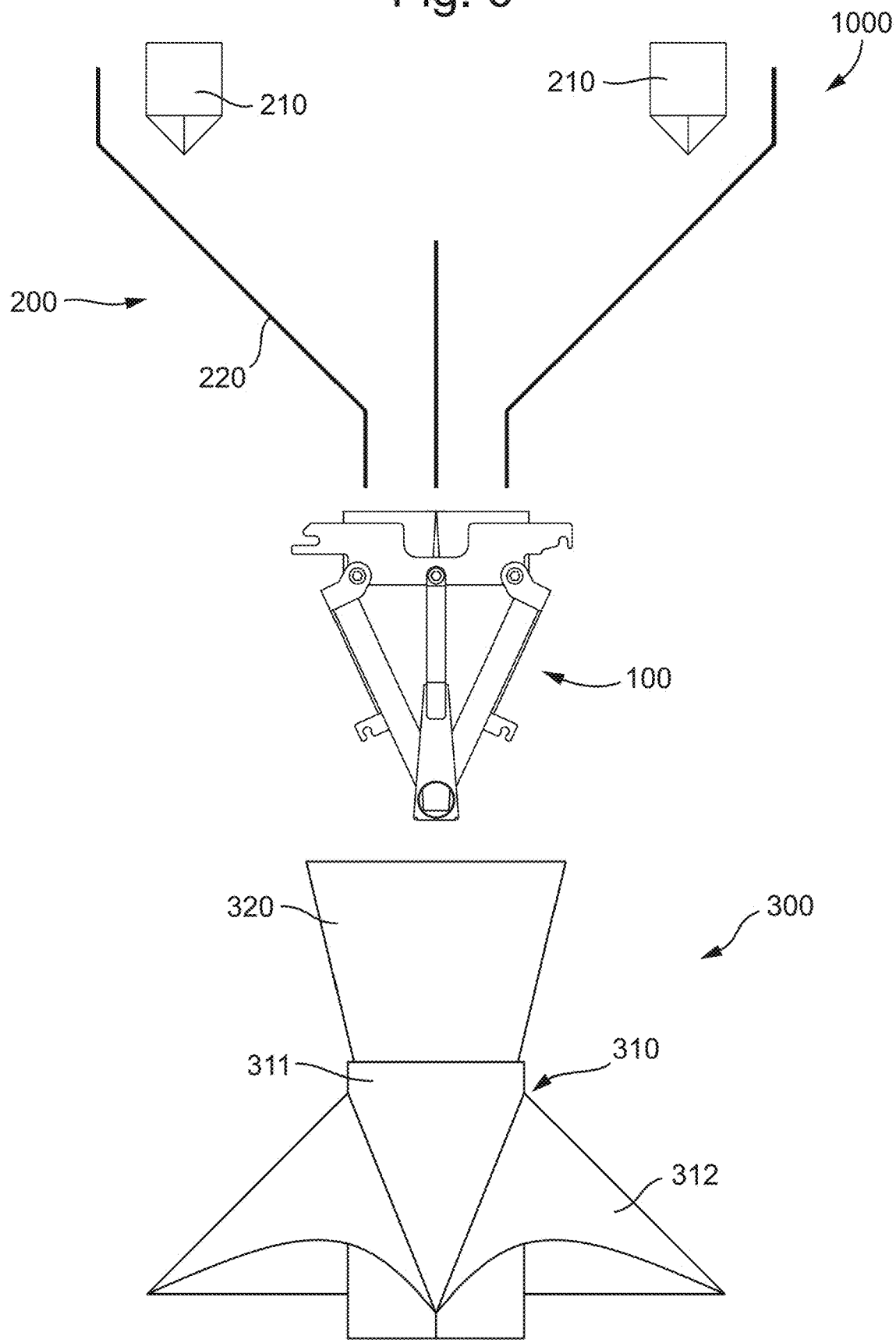
FIG. 6 shows a schematic cross section of a system in accordance with the invention, the system comprising the hopper of FIGS. 5a to 5f.

FIG. 6 schematically shows a system 100 incorporating the hopper 100 shown in FIGS. 5a-5f. The system further comprises a combination weigher 200 located upstream of the hopper 30. An example of a suitable combination weigher would be the RV-Series Multihead Weigher sold by Ishida Europe Limited of 11 Kettles Wood Drive, Woodgate Business Park, Birmingham, B32 3 DB.

Generally, a combination weigher comprises a series of weigh hoppers 210, only two of which are visible in FIG. 6, arranged in a circle about a central axis. Each weigh hopper is fed by a supply, e.g. a product dispersion table, to receive an amount of product. The weights of product in each hopper are continuously monitored and the combination weigher selects any two or more hoppers whose total weight satisfies criteria relating to the weight of a batch of product to be formed and dispenses the product from those hoppers, bringing the product together into a single batch of product having the desired weight. In the present example, the combination weigher 200 is shown as having a funnel 220 that encompasses all of the weigh hoppers 210 for bringing together product dispensed by any two or more weigh hoppers 210 and depositing the product in the slack-separating hopper 100. It should be noted that each weigh hopper 210 could also be formed as a slack-separating hopper with an internal slack removal body according to the invention, although this is not essential.

Only a portion of a packaging machine 300 is shown schematically in FIG. 6. An example of a suitable packaging machine for use in the present system would be the Astro Bagmaker sold by Ishida Europe Limited of 11 Kettles Wood Drive, Woodgate Business Park, Birmingham, B32 3 DB.

The packaging machine 300 includes a former 310 which forms a supply film into a cylinder, which cylinder of film is sealed at intervals by a sealer (not shown) to form individual bags. The former 310 comprises an inner forming tube 311 and an outer forming collar 312, which together shape the supply film into a cylinder. The packaging machine also comprises a funnel 320 that connects into the upper opening of the inner forming tube 311 and which feeds product into bags as they are being formed.

In the present system 1000, the hopper 100, having received the product from the weigher 200 and separated out the slack, dispenses the batch of product along the first path, which in this case involves the product falling vertically under gravity as the hopper opens, into the funnel 320 of the packaging machine 300, where it is received in a package, i.e. in a bag as it is formed by the packaging machine.

The product will typically be dispensed by the hopper 30 once the lower seal of a bag has been made and once the product is received in the bag an upper seal will be made to seal the bag, which upper seal will thereby form the lower seal of the next bag so that the process can be repeated.

The timing of the hopper 100 opening to dispense product into the packaging machine will typically be controlled by a system controller (not shown) that controls together the weigher 200, the hopper 100 and the packaging machine 300 of the system 1000. Typically the system will operate a full cycle in between 100 to 1000 ms and most typically between 400 and 500 ms. That is, batches of product will be dispensed by the hopper 100 at regular intervals of approximately 400 to 500 ms in order to match the production rate of packages by the packaging machine 300. As such, hoppers used in this manner are typically referred to as timing hoppers.

While FIG. 6 shows the hopper 100 integrated between a weigher 200 and a packaging machine 300, it will be appreciated that this hopper 100 is suitable for use anywhere along the production of a mixture of product and slack. For example, as mentioned, the hoppers could be integrated into the weigher 200, or could be integrated as part of the supply to the weigher 200.

The system preferably comprises a vacuum pump (not shown) configured to remove slack from the slack removal body of the hopper 100. This vacuum pump may be connected to the hopper 100 alone (i.e. the vacuum pump is connected to a single piece of equipment) or the vacuum pump may a central pump configured to be connected to a plurality of pieces of equipment within the system 1000 and/or the wider packaging facility.

In the system 1000 all product dispensed from the hopper 100 is directed to the same packaging machine. However, this is not essential and in other examples product discharged through different gates of the hopper could be directed to different discharge paths and different downstream machinery.

Figure 7A:
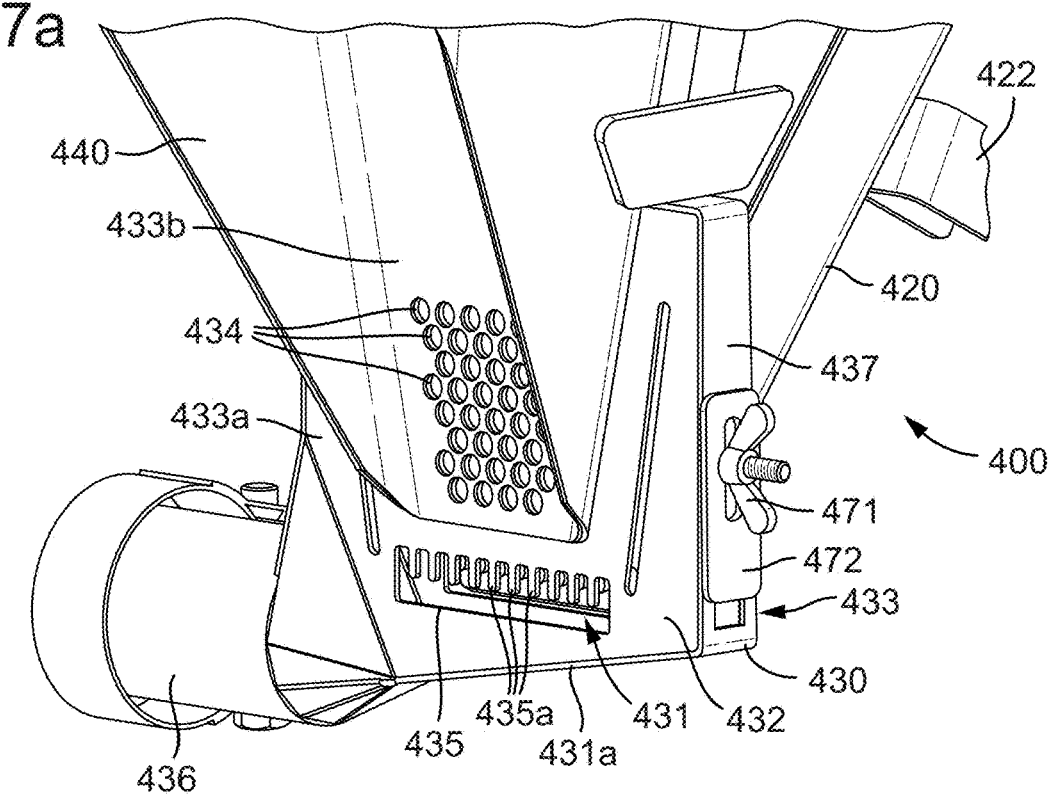
FIGS. 7a and 7b show a slack removal body suitable for use in embodiments of the invention in perspective views, specifically
Figure 7B:
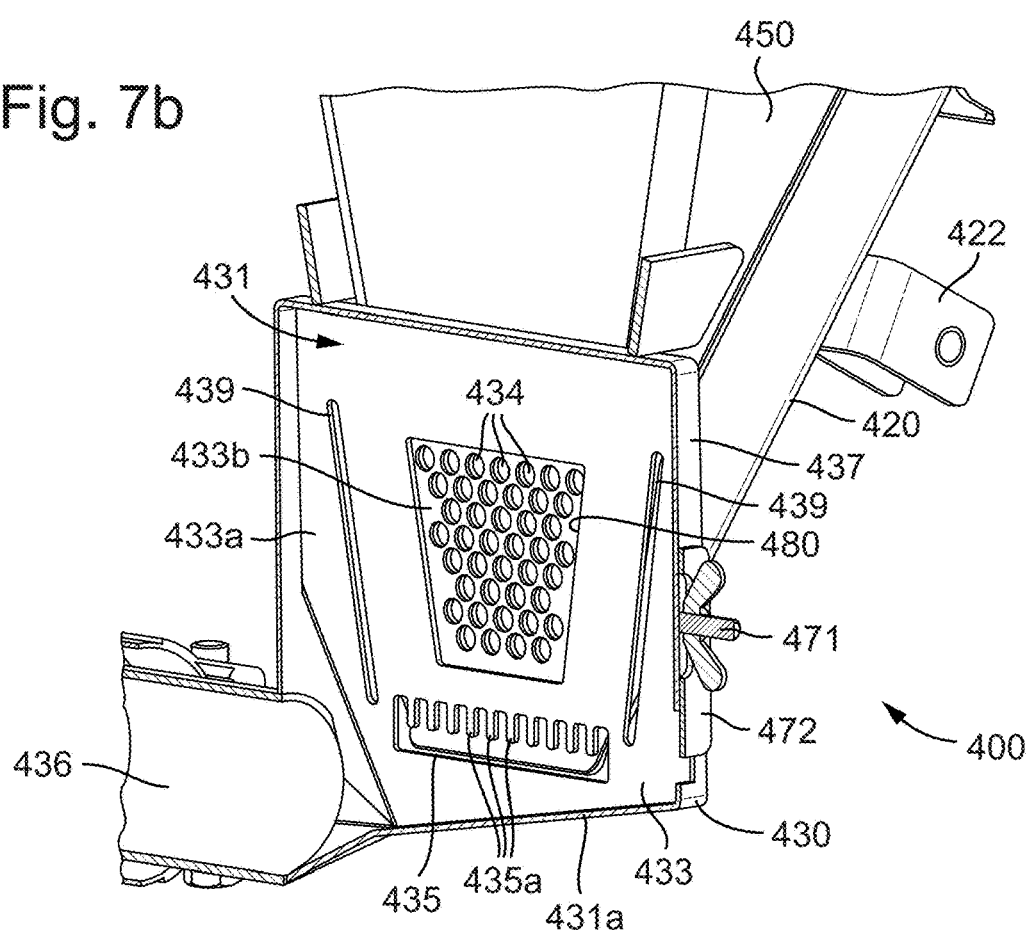

FIG. 7a shows a perspective view of the exterior of a slack removal body 430 of a further hopper 400. Whereas, FIG. 7b shows a cut-away perspective view of the interior of this slack removal body 430. The hopper 400 shares similarities with the example discussed above with reference to FIGS. 5a to 5f. Corresponding features which may have corresponding functions, construction and/or benefits have had their reference signs incremented by 300 between these figures.

The slack removal body 430 comprises an internal chamber 431 configured to receive and retain slack. The internal chamber 431 is defined between two opposed filter walls 432, 433. The filter walls 432, 433 are separated by side walls 437 of the slack removal body 430. The filter walls 432, 433 are configured to permit slack to pass therethrough but to prevent the passage of product.

As discussed above with reference to FIGS. 1a to 5f, the hopper 400 comprises moveable gates positioned on opposing sides of the slack removal body 430. The moveable gates may be moved between an open position in which the contents of the hopper may be dispensed and a closed position in which product and slack may be retained within a product receiving volume. A single moveable gate 420 is shown in FIGS. 7a and 7b to enable the features of the slack removal body 430 to be observed. The moveable gate 420 is shown in its closed position in FIGS. 7a and 7b. Each gate 420 may be actuated by (for instance) a motor such as a harmonic drive, linear servo motor or a pneumatic actuator that is connected to the respective bracket 422 on the exterior surface of the gate 420.

A mixture of product and slack may be dispensed into respective product receiving volumes defined between each gate and the slack removal body 430. The hopper comprises chutes 440, 450 arranged to guide the mixture into the respective product receiving volume.

Slack within the product receiving volumes may pass through a corresponding filter wall 432, 433 of the slack removal body 430 as discussed with reference to the previous figures. Consequently, the hopper 400 is configured to dispense product with less slack than was present in any mixture that the hopper 400 initially received.

The filter walls 432, 433 have a multi-layer construction. As will be seen, each filter wall 432, 433 is formed of two layers 432a, 432a & 433a, 433b of sheet material. Each layer 432a, 432a, 433a, 433b is preferably formed from sheet stainless steel but other materials are also suitable. In preferred examples the layers 432a, 432a & 433a, 433b and other components of the hopper 400 are laser cut and subsequently folded into an appropriate shape.

As best seen in the interior view of FIG. 7b, the two layers of each filter wall 432, 433 layers are adjacent and in contact with each other. The two layers 432a, 432b & 433a, 433b are preferably fixed to one another—e.g. by welding, rivets, bolts or other options. Welding is particularly preferred as the number of parts required is reduced. The external layer 432b, 433b of each filter wall 432, 433 is formed continuously with the respective chutes 440, 450. However, this is not essential.

The internal layer 432a, 433a and external layer 432b, 433b of each filter wall 432, 433 comprise a plurality of apertures that extend through the respective layer and through the filter wall 432, 433 as a whole. These apertures are best seen in FIG. 7b.

First, each internal layer 432a, 433a comprises a lower slot 435 configured to receive a free bottom edge of a corresponding gate when the gate is its closed position. The lower slot 435 is additionally sized to permit slack to pass therethrough but to prevent the passage of product. When the gates 420 are closed, slack will tend to travel down the internal surface of the gate 420 under gravity and through the lower slot 435 into the internal chamber 431 of the slack receiving body 430.

Each internal layer 432a, 433a comprises projections 435a—also referred to as teeth-that extend from a long edge of the lower slot 435. The projections 435a extend into and across the opening of the lower slot 435. Specifically, the projections 435a extend from an upper edge of the slot downwards across the slot. The length of the projections 435a is approximately half the width of the lower slot 430. For instance, the length of the projections may be between 25 and 75% or between 40 and 60% of the width of the lower slot 435. The projections 435a help prevent large objects from entering the internal chamber 431 through the lower slot 435. As such, in use the projections 435a help prevent product from entering the internal chamber 431 whilst allowing the passage of slack. The projections 435a are particularly valuable where product has a large range of dimensions and/or is relatively flat, having one dimension that is smaller than the others. The free edge of the corresponding gate 420 may enter the slot 435 below the projections 435a.

As shown in FIGS. 7a and 7b, the projections 435a extend in the same plane as their internal layer 432a, 433a. However, in further examples the projections 435a may be bent by a small amount into the external chamber. For instance, the projections may be bent at their base or along their length by between 0 and 40 degrees relative to the plane of the filter wall 432, 433. As such the projections 435a extend into the internal chamber 430. This may avoid conflict between the free edge of the corresponding gate 420 and the projections 435a when the gate is closed.

The internal layers 432a, 433a of the filter walls 432, 433 each further comprise two side slots 439 configured to receives the sides of the respective gate when the gate is in its closed position. This arrangement helps ensure that the gate closes tightly against the internal chamber 431 of the hopper 400, preventing product and/or slack from being incorrectly released from the hopper 400 when the gate is closed.

The external layers 432b, 433b of the internal chamber 431 comprise an array of circular apertures 434 for filtering slack from product. Each aperture 434 is relatively small, being sized to allow slack to pass but not product. Each aperture 434 has a diameter that is smaller than the minimum dimension of product. Where the slack is solid, the apertures 434 have diameters that are larger than the maximum dimension of slack. The array of circular apertures 434 is easily formed. However, in further examples the apertures 434 may have alternative shapes and/or arrangements. For instance, the apertures 434 may be formed in substantially any shape (e.g. oval, square, triangular) and be arranged in substantially any pattern including repeating or random arrangements. Additionally or alternatively, the external layers 432b, 433b may comprise a mesh, grill, grate, gauze, sieve, net or an array of slots in place of the apertures 434.

The internal layers 432a, 433a of the internal chamber 431 further comprise a large central aperture 480, as can be seen in FIG. 7b. The central aperture 480 overlies and extends across the array of circular apertures 434 in the external layers 432b, 433b which perform filtering of slack and product. As such, the perimeter of each large central aperture 480 extends around and encloses the circular apertures 434 in the corresponding external layers 432b, 433b. It can be seen therefore that the circular apertures 434 extend through both layers of the filter walls 432, 433. Slack that passes through the circular apertures 434 will enter the internal chamber 431 of the slack removal body 430.

The internal chamber 431 further comprises an angled base surface 431*a* which, in use, is angled relative to the horizontal axis and slopes down towards a port 436 of the hopper 430. The port 436 is a large aperture through which slack may be removed or collected from the internal chamber 431. In use, a vacuum pump may be connected to the port 436. Slack that has passed through the filter walls 432, 433 and has collected in the internal chamber 431 will tend to slide down the angled base surface 431*a* under gravity and/or the action of a vacuum pump if present. As such, the angled base surface 431*a* is configured to guide or urge slack towards the port 436.

The hopper 400 is secured in position by a butterfly bolt 471 which secures the hopper to a fixing bracket 472. Various other fixings are possible.

It also will be appreciated that in examples of hoppers with multi-layer filter walls that the different layers may been provided with a wide variety of apertures. For example, apertures arranged to filter slack from product may be provided in either or both layers 432*a*, 433*a* & 432*b*, 433*b* of each filter wall 432, 433 of the hopper shown in FIGS. 7*a* and 7*b*. For example, in some examples a set of apertures configured to admit slack but not product could be formed in each internal layer 432*a*, 433*a* and a larger aperture that extends across these apertures could be formed in each external layer 432*b*, 433*b* of the filter walls 432, 433. Equally, overlapping sets of small apertures arranged to filter slack from product could be provided in both layers 432*a*, 433*a* & 432*b*, 433*b*.

The hopper 400 of FIGS. 7*a* and 7*b* may be incorporated into the system 1000 shown in FIG. 6. As such, the hopper 400 may be a timing hopper configured to receive a mixture of product and slack from a computer controlled weigher or other feed device. Alternatively, the hopper 400 may be used as different hopper within a computer controlled weigher— e.g. a pool hopper, weigh hopper, booster hopper, output hopper or discharge hopper.

Additionally, the features of this hopper 400 may be combined with any of the features of the specific hoppers discussed above in relation to the previous figures. For example, the lower slot 135 in the hopper 100 of FIGS. 5*a* to 5*f* may be provided with the teeth or projections 435*a* of the hopper 400 of FIGS. 7*a* and 7*b* and/or its side slots 439. Equally, the hopper 400 of FIGS. 7*a* and 7*b* may be provided with the external apertures 138 described in reference to the hopper 100 shown in FIGS. 5*a* to 5*f*. Similarly, the hopper 400 of FIG. 7*a* or 7*b* may be provided with filter walls with a single layer, whilst the hopper 100 of FIGS. 5*a* to 5*f* may be provided with filter walls having multiple layers.

The invention offers improved products for end users, especially improved food products. The proportion of slack which ultimately reaches a customer is reduced by the hoppers, systems and methods discussed above.

Furthermore, it will be appreciated that hoppers in accordance with the invention, such as the hopper 100 shown in FIGS. 5*a*-5*f* and 6 or the hopper 400 shown in FIGS. 7*a* and 7*b*, can be easily retrofit to existing systems, replacing equivalent hoppers that are unable to remove slack. As such, the invention offers opportunities to upgrade existing systems.

The invention claimed is:

1. A hopper for separating slack from a mixture of product and slack, the hopper comprising:
   a first gate that is moveable between respective open and closed positions; and
   a slack removal body;
   the first gate and the slack removal body being arranged such that, when the first gate is in the respective closed position, the first gate and the slack removal body define a first product receiving volume therebetween;
   wherein the slack removal body comprises a first internal chamber for receiving slack and a first filter wall that separates the first internal chamber from the first product receiving volume, the first filter wall being configured to prevent the passage of product therethrough, but to allow the passage of slack therethrough;
   wherein the first gate is configured such that:
      when the first gate is in the respective open position a first path is provided for product to exit the first product receiving volume; and
      when the first gate is in the respective closed position the first path is closed and product may be retained in the first product receiving volume;
   and wherein the slack removal body is configured to remain substantially stationary as the first gate is moved between the respective open and closed positions.

2. A hopper according to claim 1, wherein the slack removal body is detachably fixed to the other components of the hopper.

3. A hopper according to claim 1, wherein the first internal chamber of the slack removal body comprises an opening through which slack may be removed.

4. A hopper according to claim 3, wherein the opening of the first internal chamber is configured to connect to a vacuum pump arranged to remove slack from the first internal chamber.

5. A hopper according to claim 3, wherein the opening is provided in or at a base surface of the first internal chamber, and wherein a base surface of the first internal chamber is angled towards the opening, so that slack will tend to travel along the first internal chamber towards the opening under gravity.

6. A hopper according to claim 1, wherein the first filter wall comprises one or more apertures, each of the apertures being sized to permit slack to pass therethrough but to prevent the passage of product therethrough.

7. A hopper according to claim 6, wherein the minimum dimension of each of the apertures in the plane of the filter wall is from 0.05 cm to 1 cm.

8. A hopper according to claim 1, wherein:
   the first filter wall comprises a slot therethrough, the slot being sized to permit slack to pass therethrough but to prevent the passage of product;
   and wherein, when the first gate is in the respective closed position, the first gate is arranged such that a free edge of the first gate is adjacent to and/or enters the slot and such that an internal surface of the first gate is angled towards the slot so that slack will tend to travel along the first gate under gravity towards the slot.

9. A hopper according to claim 1, wherein the slack removal body comprises one or more external apertures that extend between the first internal chamber and the exterior of the hopper when the first gate is in each of the respective open and closed positions;
   the external apertures being sized to permit slack to pass therethrough but to prevent the passage of product therethrough, such that airborne slack outside of the hopper may enter the slack removal body via the external apertures.

10. A hopper according to claim 1, configured such that vibrations from opening and/or closing the first gate are transmitted to the slack removal body and the respective contents.

11. A hopper according to claim 1, wherein the hopper is a hopper for use in a computer controlled weigher, and wherein the hopper is a timing hopper, weigh hopper, pool hopper, booster hopper, output hopper or discharge hopper.

12. A hopper according to claim 1, the hopper comprising:
   a second gate that is moveable between respective open and closed positions;
   the second gate and the slack removal body being arranged such that, when the second gate is in the respective closed position, the second gate and the slack removal body define a second product receiving volume therebetween;
   and wherein the second gate is configured such that:
      when the second gate is in the respective open position a second path is provided for product to exit the second product receiving volume; and
      when the second gate is in the respective closed position said second path is closed and product may be retained in the second product receiving volume.

13. A hopper according to claim 12, wherein:
   the first and second gates are opposed and the slack removal body is positioned between the opposed first and second gates;
   wherein the slack removal body comprises a second internal chamber for receiving slack and a second filter wall that separates the second internal chamber from the second product receiving volume, the second filter wall being configured to prevent the passage of product therethrough, but to allow the passage of slack therethrough.

14. A hopper according to claim 13, wherein the first internal chamber and the second internal chamber of the slack removal body are the same chamber.

15. A system comprising:
   one or more hoppers according to claim 1;
   and a computer controlled weigher and/or a packaging machine.

16. A method of separating slack from a mixture of product and slack using a hopper according to claim 1, the method comprising the steps of:
   (a) providing a mixture of product and slack into the first product receiving volume of the hopper when the first gate is in the respective closed position, such that product is retained within the first product receiving volume and such that at least some slack from the mixture passes through the first filter wall and into the first internal chamber of the slack removal body;
   (b) moving the first gate of the hopper into the respective open position such that the remaining contents of the first product receiving volume exit the hopper.

17. A method according to claim 16, wherein the method further comprises: (c) moving the first gate into the respective closed position;
   and wherein the method comprises repeating steps (a) to (c).

18. A method according to claim 17, wherein step (c) comprises two discrete closing steps:
   a first closing step in which the first gate is moved to an intermediate position between the respective open and closed positions;
   and a subsequent, second closing step in which the first gate is moved from the intermediate position to the respective closed position.

19. A method according to claim 17, wherein: steps (a) and (b) are performed at least 100 ms apart;
   and/or the method further comprises the steps of, following (a):
   (i) obtaining a time series of weight measurements of the contents of the hopper and/or the first product receiving volume;
   (ii) making a determination, based on the weight measurements, that the weight of the contents has stabilised;
   and wherein step (c) is only performed once said determination has been made.

20. A method according to claim 16, wherein the method is performed using a hopper comprising:
   a second gate that is moveable between respective open and closed positions;
   the second gate and the slack removal body being arranged such that, when the second gate is in the respective closed position, the second gate and the slack removal body define a second product receiving volume therebetween;
   and wherein the second gate is configured such that:
      when the second gate is in the respective open position a second path is provided for product to exit the second product receiving volume; and
      when the second gate is in the respective closed position said second path is closed and product may be retained in the second product receiving volume;
   and wherein the method further comprises:
   (e) providing a mixture of product and slack into the second product receiving volume of the hopper when the second gate is in the respective closed position, such that product is retained within the second product receiving volume and such that at least some slack from the mixture passes through a second filter wall and into a second internal chamber of the slack removal body:
   (f) moving the second gate of the hopper into the respective open position such that the remaining contents of the second product receiving volume exit the hopper;
   and wherein steps (b) and (f) are performed separately or simultaneously.

* * * * *